(12) United States Patent
Olden

(10) Patent No.: US 6,460,141 B1
(45) Date of Patent: Oct. 1, 2002

(54) SECURITY AND ACCESS MANAGEMENT SYSTEM FOR WEB-ENABLED AND NON-WEB-ENABLED APPLICATIONS AND CONTENT ON A COMPUTER NETWORK

(75) Inventor: Eric M. Olden, San Francisco, CA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/182,265

(22) Filed: Oct. 28, 1998

(51) Int. Cl.$^7$ ............................................. G06F 12/14
(52) U.S. Cl. ...................................... 713/201; 713/202
(58) Field of Search ................................. 713/200, 201, 713/202, 203

(56) References Cited

U.S. PATENT DOCUMENTS

| | | | |
|---|---|---|---|
| 5,557,747 A | 9/1996 | Rogers et al. | 395/200.11 |
| 5,968,176 A | 10/1999 | Nessett et al. | 713/201 |
| 5,983,270 A | 11/1999 | Abraham et al. | 709/224 |
| 5,983,350 A | 11/1999 | Minear et al. | 713/201 |
| 6,088,451 A | * 7/2000 | He | 380/25 |
| 6,151,606 A | * 11/2000 | Mendez | 707/201 |
| 6,158,010 A | 12/2000 | Moriconi et al. | 713/201 |
| 6,205,415 B1 | * 3/2001 | Butts et al. | 703/27 |
| 6,233,542 B1 | * 5/2001 | Butts et al. | 703/27 |
| 6,233,543 B1 | * 5/2001 | Butts et al. | 703/27 |

FOREIGN PATENT DOCUMENTS

| | | |
|---|---|---|
| WO | WO 00/25214 | 5/2000 |

OTHER PUBLICATIONS

U.S. application No. 09/483,645, Field et al., filed Jan. 14, 2000.

User Guide for Bankers Trust, Authorization Manager, Aug. 13, 1997.

User Guide for Bankers Trust, Security Instructions Services, Oct. 1, 1997.

* cited by examiner

*Primary Examiner*—Norman M. Wright
(74) *Attorney, Agent, or Firm*—Testa, Hurwitz & Thibeault, LLP

(57) ABSTRACT

A security and access management system provides unified access management to address the specific problems facing the deployment of security for the Web and non-Web environment. Unified access management consists of strategic approaches to unify all key aspects of Web and non-Web security policies, including access control, authorization, authentication, auditing, data privacy, administration, and business rules. Unified access management also addresses technical scalability requirements needed to successfully deploy a reliable unified Web and non-Web security system. The security and access management system provides the technology required to support these key factors as they relate to Web and non-Web security. The security and access management system operates in combination with network and system security tools such as firewalls, network intrusion detection tools, and systems management tools to provide comprehensive security for the Web-enabled enterprise.

3 Claims, 36 Drawing Sheets

| ClearTrust Manager | | | | | | | |
|---|---|---|---|---|---|---|---|
| Manager System Page Help | | | | | | | |

ClearTrust  SecureControl

| Users | Applications | Basic Entitlements | Smart Rules | Web Servers | Administrators | User Properties | Test |
|---|---|---|---|---|---|---|---|

User Properties

[Create] [Modify] [Delete]  [Search]

| Name | Type | Owner | NotNull | ReadOnly |
|---|---|---|---|---|
| COFI | INT | Clear1 | true | false |
| Crude Oil | DATE | Clear1 | true | false |
| Currency Desk | INT | Clear1 | true | false |
| DProperty | BOOLEAN | Clear1 | true | false |
| Futures Contracts | STRING | Clear1 | true | false |
| Gold | BOOLEAN | Clear1 | true | false |
| LIBOR | FLOAT | Clear1 | true | false |
| Leverage Buyouts | DATE | Clear1 | true | false |
| Options Desk | INT | Clear1 | true | false |
| Real Estate | BOOLEAN | Clear1 | true | false |
| Treasury | STRIN | Clear1 | true | false |

ClearTrust Manager 2.6

FIG. 26

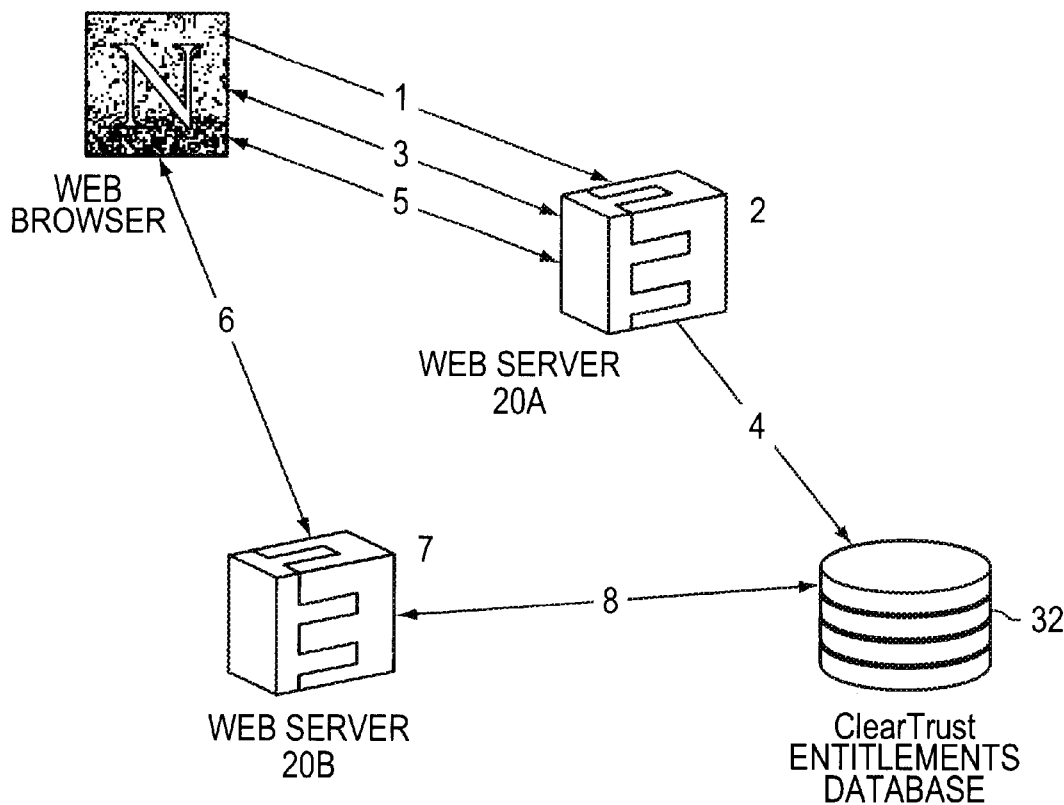

1. BROWSER REQUEST SECURED CONTENT FROM CT PROTECTED WEB SERVER 'A'.
2. CT PLUG-IN CHECKS FOR COOKIE.
3. BECAUSE THIS IS FIRST AUTHENTICATION, USER PROVIDES USERNAME AND PASSWORD.
4. USER PERMISSIONS CHECKED.
5. BUILD COOKIE AND SET FOR BROWSER.
6. WEB USER ACCESSES CT PROTECTED WEB SERVER 'B'.
7. PLUG-IN ON WEB SERVER B USES COOKIE FOR AUTHENTICATION.
8. PERMISSIONS ARE CHECKED FOR USER BASED ON CREDENTIALS IN COOKIE.

FIG. 30

| CONFIGURE POLICY | REPORTS | CONFIGURE ENGINE | ACTIONS | | | |
|---|---|---|---|---|---|---|
| PASSWORD ATTACK 1 | INCORRECT PASSWORD | 3 | 5 min | b) EMAIL ADMIN | | |
| PASSWORD ATTACK 2 | INCORRECT PASSWORD | 5 | 3 min | a) DISABLE ACCOUNT<br>b) EMAIL ADMIN | | |
| UNAUTHORIZED ACCESS 1 | ACCESS DENIED | 4 | 6 min | a) EMAIL ADMIN | | |
| UNAUTHORIZED ACCESS 2 | ACCESS DENIED | 5 | 4 min | a) DISABLE ACCOUNT<br>b) EMAIL ADMIN | | |

Add  Modify  Delete

FIG. 31

SECURITY AND ACCESS MANAGEMENT SYSTEM FOR WEB-ENABLED AND NON-WEB-ENABLED APPLICATIONS AND CONTENT ON A COMPUTER NETWORK

FIELD OF THE INVENTION

The present invention relates to computer networks and, more particularly, to a computer network in which execution of applications and use of content by users of the computer network is controlled. Specifically, one embodiment of the present invention provides a comprehensive and efficient unified security and access management system for enterprise security and access control, so that the availability of intranet, extranet, and electronic commerce ("e-commerce") applications and content to users of the computer network can be effectively controlled and the integrity of the applications and content can be assured by the owner of the enterprise.

BACKGROUND OF THE INVENTION

Enterprise owners continue to develop intranet and extranet applications for local and wide area computer networks. These enterprise owners have in many instances also developed Web-enabled applications and content, as well as e-commerce solutions, that are available to customers over the Internet. A major challenge to these enterprise owners is to secure the integrity of Web-enabled, as well as non-Web-enabled, intranet, extranet, and e-commerce applications and content. Consequently, there is a need by both enterprise owners and customers in the field of computer network security and access control for applications and content.

At the present time, the growth of computer networks has strained the capabilities of known security architectures. Major concerns have arisen regarding control of access to critical applications and content and to process access requests, which requires a security architecture to enable network authentication and to provide secure access control.

Network security management tools such as perimeter protection, anti-viral protection, encryption, and intrusion detection have been deployed to secure communications between and across networks. System security management tools secure the systems upon which applications execute, including operating system level security and access control for traditional client/server database applications or file systems. While Web applications are accessed across networks and operate on managed systems, due to their highly distributed nature, Web applications have specific security requirements which are not protected by network and systems management products.

Unauthorized users can cause incredible damage in a very short time. They can break into the supply chain applications of an enterprise and disrupt the flow of production lines. They can cause the Internet to place unauthorized orders on an e-commerce system and steal goods or cause havoc by shipping unauthorized orders to important customers. Electronic banking applications are also prime targets for unauthorized users. Competitors can use the Internet to access sensitive marketing plans, customer lists, or product plans intended for legitimate partners on the extranet.

The internal network presents many additional risks. Employees can use the intranet to access sensitive employee data on human resource applications. Trusted users, such as employees, represent more than forty percent of documented attacks. Organizations erroneously assume that critical information assets, both inside and outside, are fully protected and secure. Most enterprises are far from secure, yet remain unaware of exactly where they are vulnerable.

There are fundamental challenges associated with providing effective Web security. Discontinuity exists between the Internet/Web technologies of today and traditional security systems. Security policy is fragmented across platforms, vendors, and point solutions. Integration of Web security infrastructure with existing infrastructure is not in place. Current security approaches are not scalable.

Therefore, there is a need for an improved security and access control system. The present invention satisfies this need by providing a unified security and access management system for computer networks.

SUMMARY OF THE INVENTION

The present invention provides a security and access management system for Web-enabled and non-Web-enabled applications and content on a computer network. One embodiment of the security and access management system in accordance with the present invention is based on a management model which brings together disparate infrastructure components, consolidates multiple security policies, and embraces both Web and emerging Internet technologies to properly address the security requirements of the Web.

The security and access management system of the present invention provides a uniform access management model to address the specific problems facing the deployment of security for the Web and non-Web environment. Unified access management consists of strategic approaches to unify all key aspects of Web and non-Web security policies, including access control, authorization, authentication, auditing, data privacy, administration, and business rules. Unified access management also addresses technical scalability requirements needed to successfully deploy a reliable unified Web and non-Web security system. The security and access management system in accordance with a preferred embodiment of the present invention provides the technology required to support these key factors as they relate to Web and non-Web security. The security and access management system of the present invention operates in combination with network and system security tools such as firewalls, network intrusion detection tools, and systems management tools to provide comprehensive security for the Web-enabled enterprise.

BRIEF DESCRIPTION OF THE DRAWINGS

The above and other objectives and features and the concomitant advantages of the present invention will be better understood and appreciated by those skilled in the art in view of the description of the preferred embodiments given below in conjunction with the accompanying drawings. In the drawings:

FIGS. 6–27 illustrate screens or panels that are displayed by the security and access management system of the present invention to provide security and access management;

FIG. 30 illustrates a configuration of the security and access management system shown in FIG. 1 to enable a single sign on by a user; and FIGS. 31–33 illustrate panels that are displayed by the security and access management system of the present invention to monitor attempts at unauthorized access.

DETAILED DESCRIPTION OF THE PREFERRED EMBODIMENTS

The following description provides a system administrator with information on understanding, administering, and maintaining servers incorporated into the security and access management system of the invention. The following description also provides a security architect with information for effectively developing and managing the application-access security model for an organization.

The following description is divided into two main sections: architecture and administration. The architecture section provides an overview of the architecture of the security and access management system in accordance with the invention and the data model. The administration section details administration of the server-side components, including starting and stopping of the server components and descriptions of the server log files.

Figure 1:
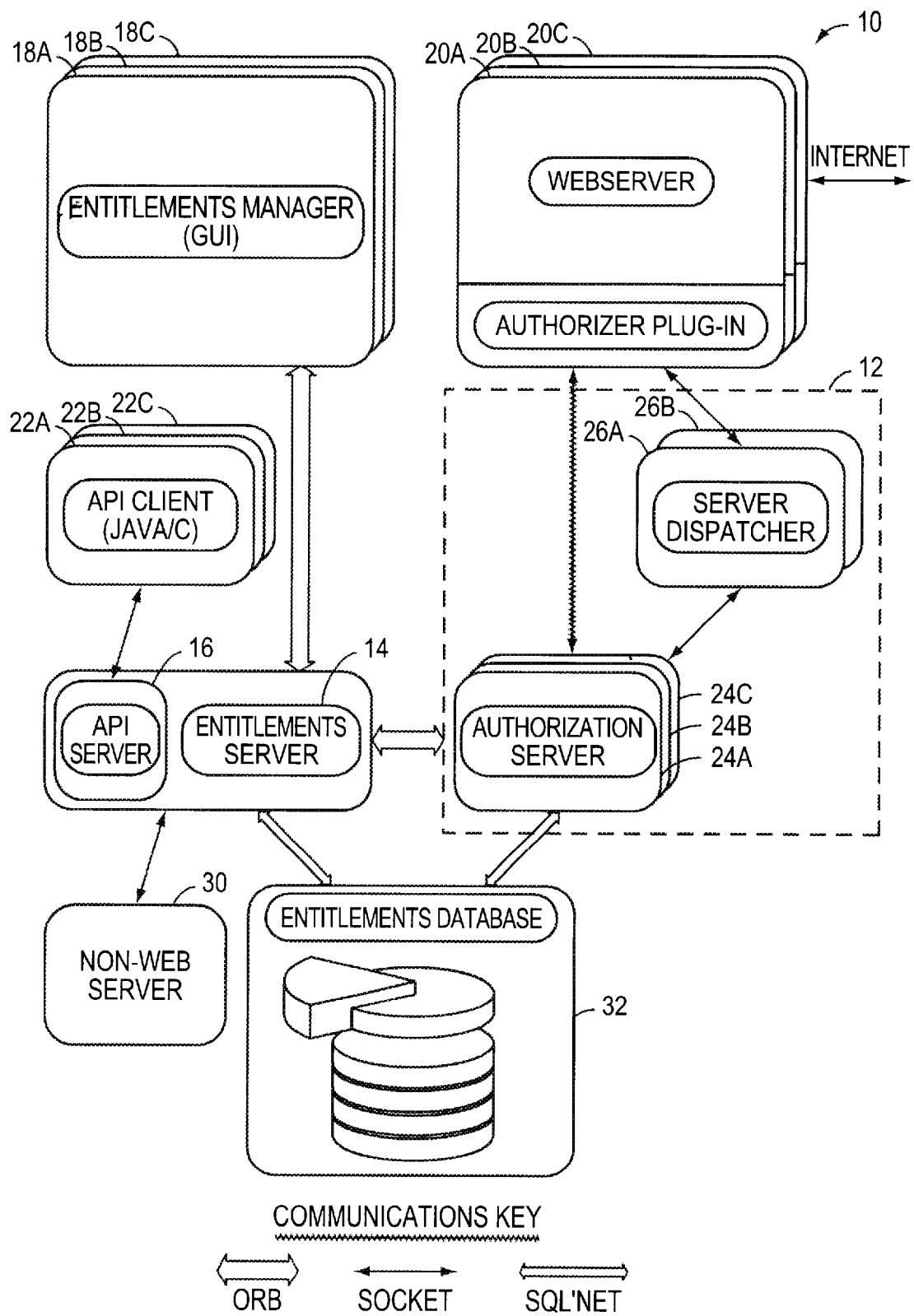
FIG. 1 illustrates one embodiment of the architecture of the security and access management system in accordance with the present invention.

The security and access management system of the present invention, generally indicated by the numeral 10 in FIG. 1, is a highly scalable, reliable, and configurable security architecture. As shown in FIG. 1, the architecture for the security and access management system 10 comprises five main components: at least one authorization component 12; an entitlements (database) server component 14; an API server 16; an administrative client (graphical user interface) 18; and at least one enabled Web server 20 connected to the remainder of the computer network, for example, over the Internet. The first three components are server-side components. Each of the server-side components will now be described in more detail.

The authorization component 12 performs authorization processing on behalf of either an enabled Web server 20 or an API client 22. The authorization component 12 comprises an authorization server 24. Preferably, as shown in FIG. 1, the authorization component 12 comprises a plurality of authorization servers 24A, 24B, 24C and at least one authorization dispatcher 26. In order to avoid a single point source of failure, a plurality of authorization dispatchers 26A, 26B also preferably comprises the authorization component 12.

In the case in which the authorization component 12 comprises a single authorization server 24, no authorization dispatcher 26 is required, and the single authorization server processes all authorization requests. If the single authorization server 24 goes down, authorization requests cannot be processed.

Consequently, the preferred configuration is as shown in FIG. 1, in which the security and access management system 10 comprises the plurality of authorization servers 24A, 24B, 24C and authorization dispatchers 26A, 26B, which operate in conjunction to provide efficient scalability of authorization requests. For example, it is possible to start many authorization servers 24A, 24B, 24C on different machines, allowing for load balancing and fail-over of authorization requests. In order to manage the various authorization servers 24A, 24B, 24C, the authorization dispatchers 26A and 26B contain a repository of all available authorization servers.

One of the authorization servers 24A, 24B, 24C communicates with an enabled Web server 20A, 20B, 20C and the authorization dispatchers 26A and 26B over a socket connection. The authorization servers 24A, 24B, 24C communicate with the entitlements server component 14 over a CORBA ORB (Object Request Broker).

Additionally, each authorization server 24A, 24B, 24C preferably contains several caches to maximize performance of authorization requests. As information is retrieved during authorization processing, the information is stored in various caches. This allows for quick retrieval when information is re-requested. Each cache preferably has a defined maximum size to contain memory growth. Consequently, as a cache reaches its maximum size, information contained within the cache is aged out.

The entitlements server component 14 performs database processing on behalf of at least one entitlements manager administrative client 18 and the API server 16. In addition, the entitlements server component 14 also forwards requests from the entitlements manager administrative client 18 and API server 16 to the authorization servers 24A, 24B, 24C comprising the authorization component 12.

Communications between the entitlements server component 14 and both administrative clients 18A, 18B, 18C and authorization servers 24A, 24B, 24C occur over a CORBA ORB. In order for the authorization servers 24A, 24B, 24C and administrative clients 18A, 18B, 18C to establish a communication channel with the entitlements server component 14, the entitlements server component is assigned a name that uniquely identifies it to the ORB. In contrast to the preferred configuration in which there is a plurality of authorization servers 24A, 24B, 24C, there is preferably only a single entitlements server component 14.

The API server component 16, in conjunction with the entitlements server component 14, performs database processing on behalf of an API client 22. Unlike an authorization server 24A, 24B, 24C or administrative client 18, the API server component 16 is preferably an element within the entitlements server component 14, as shown in FIG. 1. Communications between the API server component 16 and an API client 22A, 22B, 22C occur over a socket connection from an assigned port.

As shown in FIG. 1, the Web servers 20A, 20B, 20C provide Web-enabled applications and content to computer network users. Also, the security and access management system 10 provides the capability to provide security and access management to non-Web-enabled applications. Such non-Web-enabled applications can be provided through the API clients 22A, 22B, 22C on at least one non-Web server 30, as shown in FIG. 1. Communications between the API server component 16 and the non-Web server 30 occur over a socket connection.

The security and access management system 10 is selectively operated in one of two modes, namely, standard mode or distributed mode. Each mode has fail-over capabilities.

On the one hand, standard mode means that the security and access management system 10 is running the authorization servers 24A, 24B, 24C on a single machine with a primary authorization server and a stand-by authorization server. The primary authorization server 24A, 24B, or 24C handles all of the access requests for all of the Web servers 20A, 20B, 20C. It is only if the primary authorization server 24A, 24B, or 24C is unavailable that the stand-by authorization server is used.

On the other hand, distributed mode means that the security and access management system 10 is running multiple authorization servers 24A, 24B, 24C across multiple servers. In the preferred embodiment of the security and access management system 10, distributed authorization servers can run on NT and UNIX servers simultaneously. The distributed mode load-balances requests by the Web servers 20A, 20B, 20C in a round robin fashion across all of the authorization servers 24A, 24B, 24C. In the event that a single authorization server 24A, 24B, or 24C is unavailable, the surviving authorization servers continue to fulfill requests from the Web servers 20A, 20B, 20C.

Figure 1A:
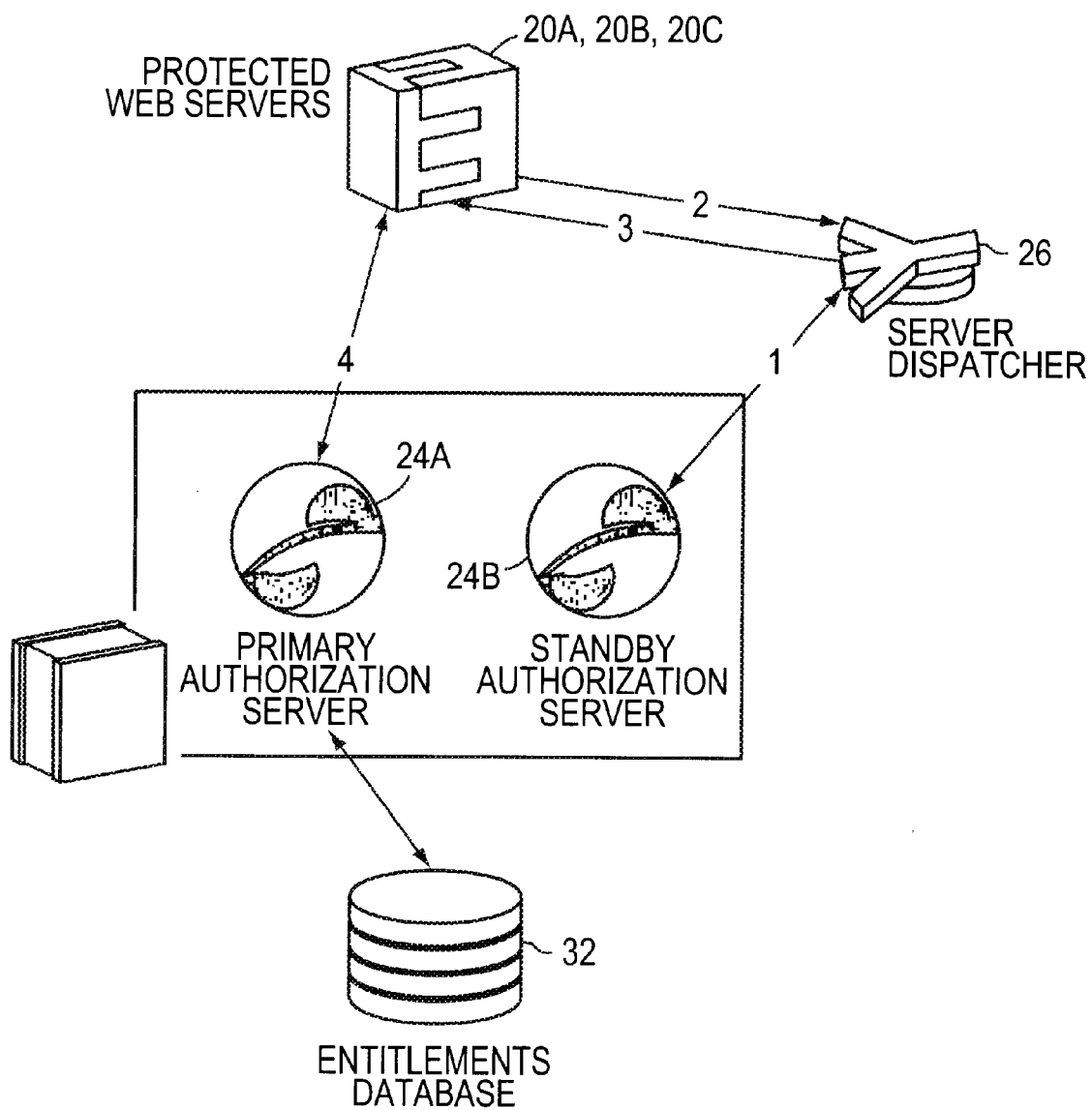
FIGS. 1A–1D illustrate various configurations of the security and access management system shown in FIG. 1 during normal operation and in alternative fail-over modes.
Figure 1B:
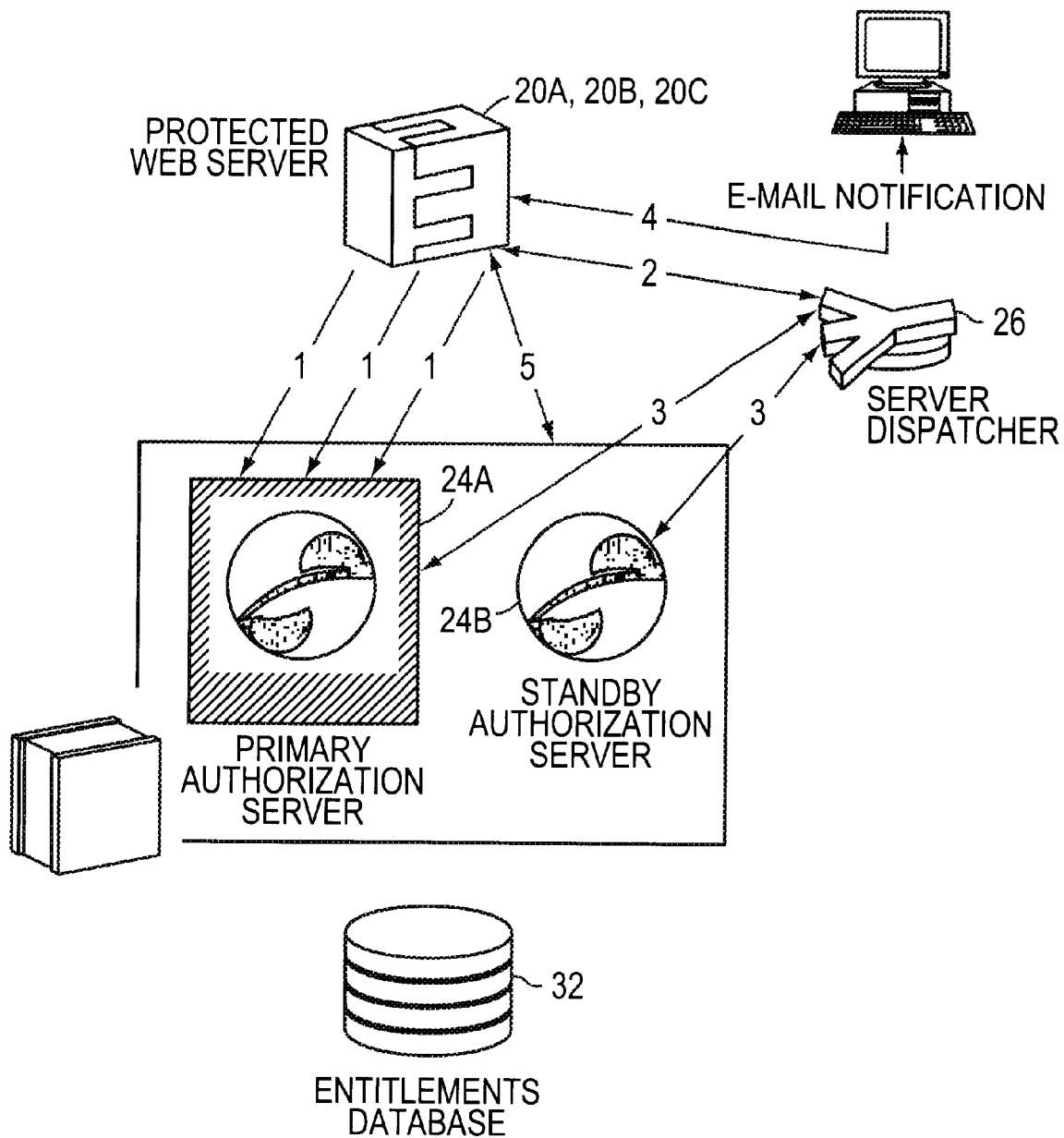

Referring to FIG. 1A, the standard mode start-up process is as follows.
1) When the authorization servers 24A, 24B, 24C are started, the authorization servers notify the authorization dispatcher 26 of their availability.
2) When the Web server plug-ins are started, the plug-ins query the authorization dispatcher 26 for available authorization servers 24A, 24B, 24C. The authorization dispatcher 26 queries all of the authorization servers 24A, 24B, 24C to verify that the authorization servers are available.
3) The authorization dispatcher 26 sends a list of the available authorization servers and their ports to the plug-ins.
4) The plug-ins then start querying the primary authorization server 24A, 24B, or 24C for authorization requests. The primary authorization server 24A, 24B, or 24C queries the entitlements database 32 for entitlements and responds to the requests from the plug-ins.
1) Referring to FIG. 1B, if the primary authorization server 24A, 24B, or 24C becomes unavailable in the standard mode, the request of a plug-in will time out after a configurable time period. After the request of the plug-in times out a configurable number of times, for example, three times, then the plug-in needs to access another authorization server 24A, 24B, 24C.
2) The plug-in contacts the authorization dispatcher 26 to notify the authorization dispatcher that the primary authorization server 24A, 24B, or 24C is not available.
3) The authorization dispatcher 26 queries all of the registered authorization servers 24A, 24B, 24C to verify availability. When the authorization dispatcher 26 determines that the primary authorization server 24A, 24B, or 24C is down, the authorization dispatcher notifies an administrator via email. An error log is written to record the failure.
4) The authorization dispatcher 26 then sends the port of the available stand-by authorization server 24A, 24B, or 24C to the plug-in.
5) The plug-in begins querying the stand-by authorization server 24A, 24B, or 24C for authorization requests.

Figure 1C:
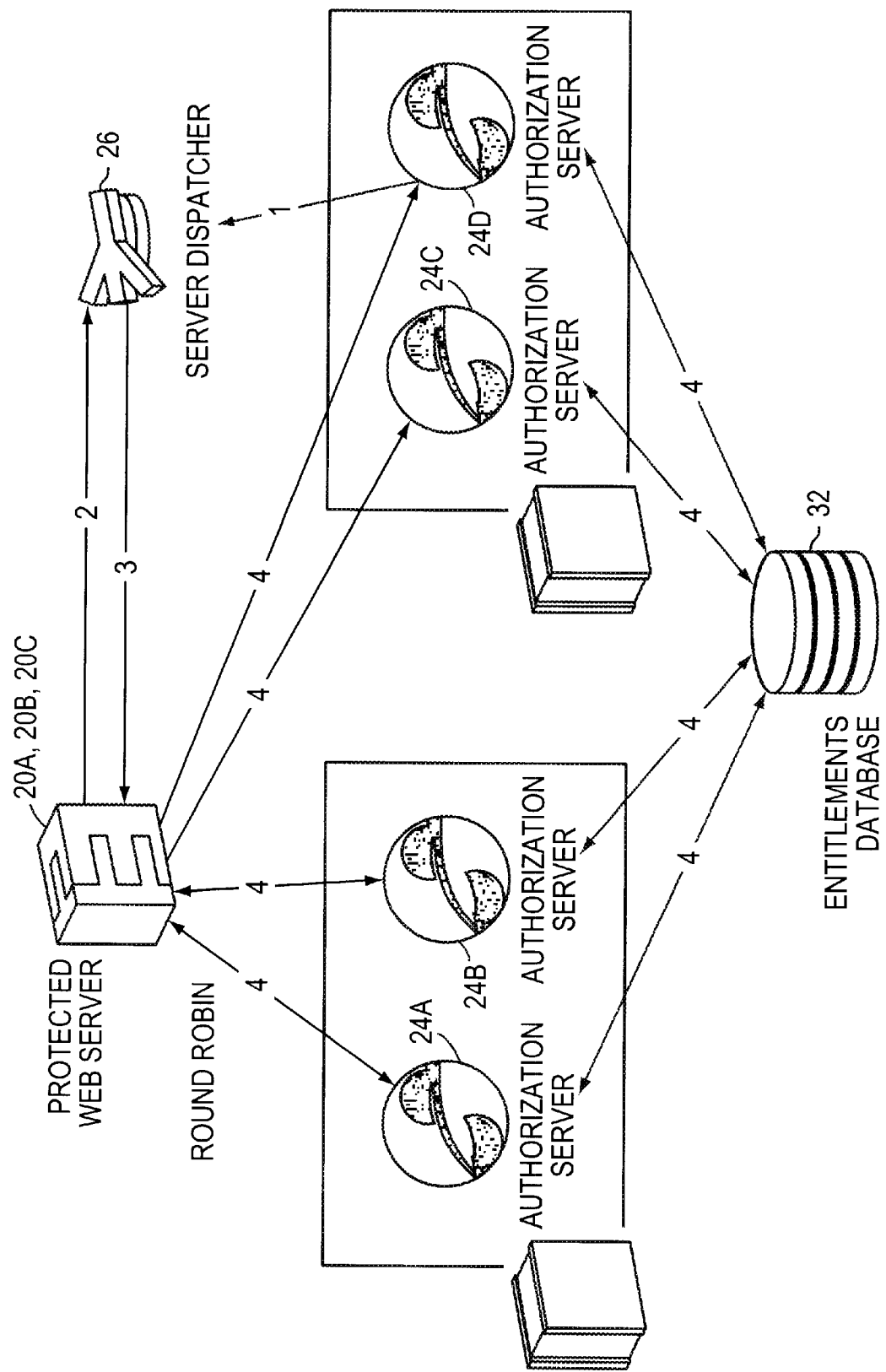
Figure 1D:
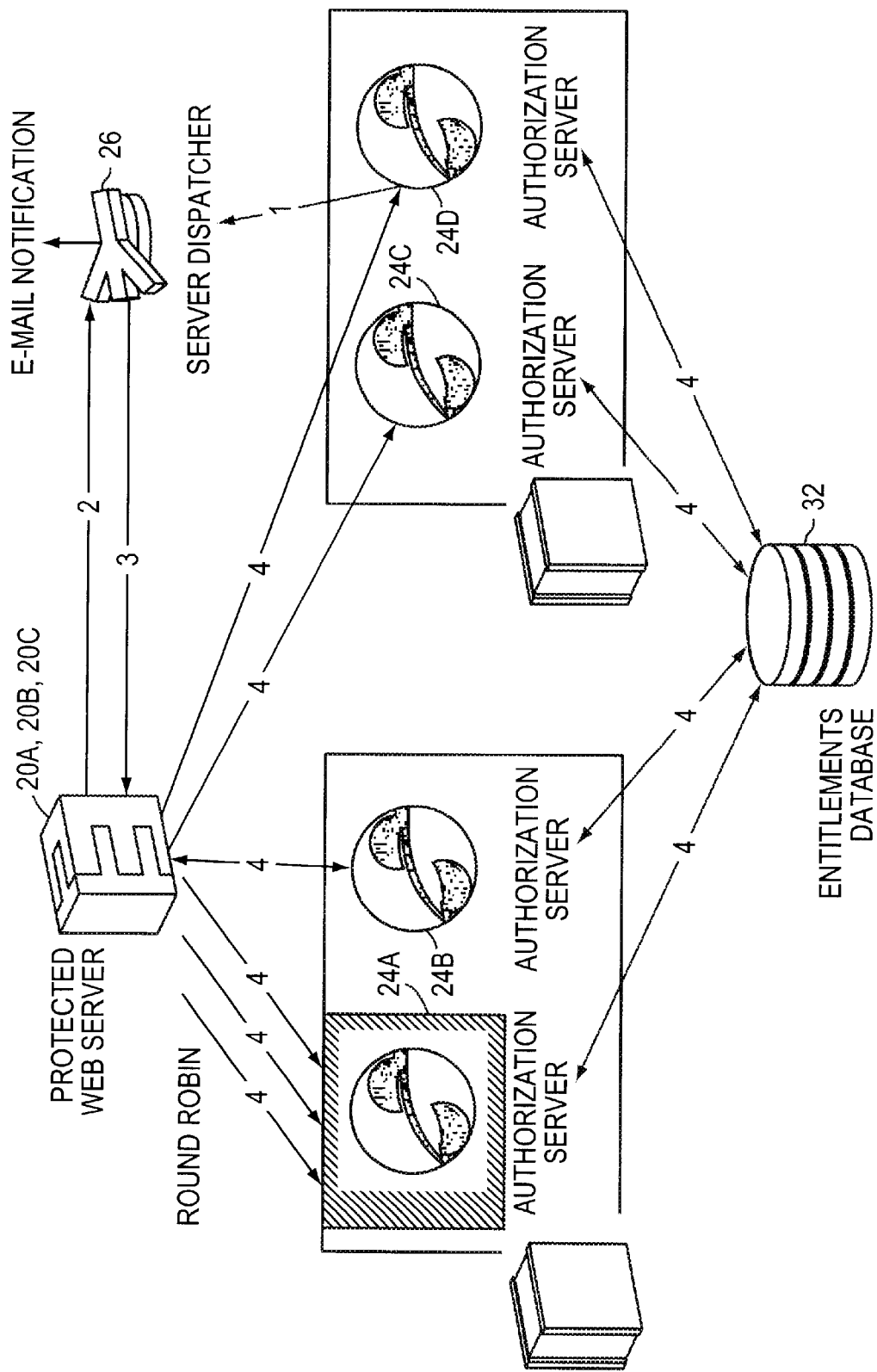

Referring to FIG. 1C, the distributed mode start-up process is as follows.
1) When the authorization servers 24A, 24B, 24C are started, the authorization servers notify the authorization dispatcher 26 of their availability.
2) When the plug-ins of the Web servers 20A, 20B, 20C are started, the plug-ins query the authorization dispatcher 26 for available authorization servers 24A, 24B, 24C. The authorization dispatcher 26 queries all of the authorization servers 24A, 24B, 24C to verify that the authorization servers are available.
3) The authorization dispatcher 26 sends a list of the available authorization servers 24A, 24B, 24C and their ports to the plug-ins.
4) The plug-ins then start querying the authorization servers 24A, 24B, 24C in a round robin fashion for authorization requests.
1) Referring to FIG. 1D, if any authorization server 24A, 24B, or 24C becomes unavailable in the distributed mode, the request of a plug-in will time out after a configurable time period. After the request of the plug-in times out a configurable number of times, for example, three times, then the plug-ins needs to access another authorization server 24A, 24B, or 24C. The plug-ins continue to query the remaining authorization servers 24A, 24B, 24C for authorization services.
2) The plug-in contacts the authorization dispatcher 26 to notify the authorization dispatcher that an authorization server 24A, 24B, or 24C has not been available.
3) The authorization dispatcher 26 queries all of the registered authorization servers 24A, 24B, 24C to verify availability. When the authorization dispatcher 26 determines that an authorization server 24A, 24B, or 24C is down, the authorization dispatcher notifies an administrator via email. An error log is written to record the failure.
4) The authorization dispatcher 26 then sends the port of the available stand-by authorization server 24A, 24B, 24C to the plug-in.
5) The plug-ins continue querying the surviving authorization servers 24A, 24B, 24C for authorization requests.

The security and access management system 10 preferably additionally comprises a redundant database for the entitlements database 32 to avoid a last single potential point source of failure. That is, the security and access management system 10 can also support replicated databases. This replication is preferably provided using Oracle's replication technology. The authorization servers 24A, 24B, 24C can be integrated to automatically fail-over to a back-up entitlements database on another server.

The security and access management system 10 provides a highly flexible and scalable data model for defining both accessibility of resources and applications and data model administration policy. While the security and access management system 10 provides out-of-the-box support for Web-based applications, the security and access management system is also powerful and flexible enough to secure proprietary applications, such as the applications which run on the non-Web server 30 shown in FIG. 1. Security policy is defined using an access control architecture. Through the access control architecture, protected resources are associated with resource consumers, defining access control policy. Additionally, the security and access management system 10 provides a robust administration architecture, securing access to the entitlements database 32. Through the administration architecture, a user is associated with administrative rights and ownership, defining an administrative policy.

Figure 2:
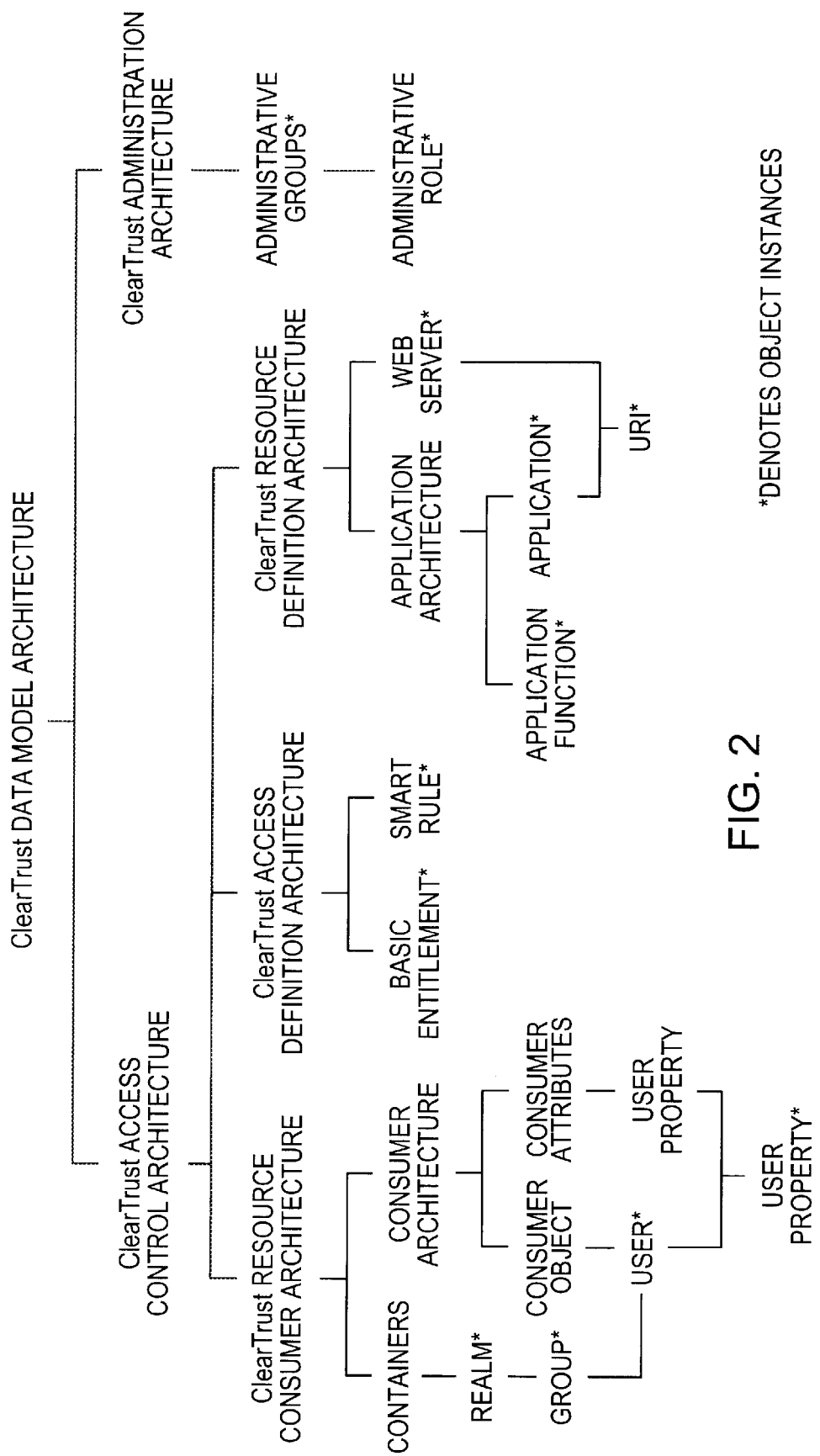
FIG. 2 illustrates the data model architecture of the security and access management system of the present invention.

The hierarchy for the complete data model administration architecture, generally indicated by the numeral 50, is shown in FIG. 2. The data model administration architecture 50 preferably comprises an access control architecture 52 and an administrative architecture 54. The access control architecture 52 is divided into three components: resource consumer architecture 56; access definition architecture 58; and resource definition architecture 60. These components constitute the basic building blocks for an access policy.

A resource consumer is granted or denied access privilege to a resource depending on policy as defined by the access definition architecture 58. Additionally, the access definition architecture 58 is flexible enough to define policy beyond simple access of resources. This will be described in greater detail below.

Considered in more detail, a resource consumer is someone who accesses or manipulates a defined resource. Generally, a resource consumer is someone who requests access to a Web-enabled or non-Web-enabled application or content. For example, a resource consumer could be an employee who needs to retrieve sensitive documents, a customer who wishes to modify his or her account information, or a supplier with rights to view, purge, or otherwise update factory floor data. In any event, an architecture needs to be flexible enough to dynamically define the attributes of a resource consumer and scalable enough to handle large numbers of consumers and resources. The resource consumer architecture 56 achieves flexibility and scalability by defining an extendable consumer data model and a containment hierarchy of consumers.

Specifically, as shown in FIG. 2, the resource consumer architecture 56 comprises a consumer architecture which is divided into a consumer object model 64 and an extensible consumer attribute model 66. A consumer object is referred to as a user 68. A user 68 has several defined attributes (for example, user ID, first name, last name, password, etc.), as well as extendible attributes. These extendible attributes are referred to as user properties 70. The name and type of a user property 70 (for example, a string property, a date property, and integer property, etc.) is defined by a user property definition 72. When a user property definition 72 is created, all users 68 automatically inherit a user property 70 of the defined name and type. However, a value is not automatically assigned to a user property 70. A user property definition 72 preferably includes at least one of the following types: Boolean; string; integer; floating point; and date.

The resource consumer architecture 56 also provides a containment hierarchy or containers 74 of users 68. This allows an administrator to more easily assign access rights to a large group of users 68 without having to assign rights individually. A user 68 can be grouped together into a group object 76. Group objects 76 likewise can be grouped together into a realm object 78.

For example, a software company has developed an application allowing customer companies to view their account information. Each customer company may have several points of contact that are allowed to access the account database. An administrator defines a user 68 for each point of contact, adds each user 68 to a group 76 that represents the customer company, adds the group to a customer realm 78, and defines a user property 72, such as "service contract," of type integer. Then the administrator sets the service contract user property value for each user 68.

As shown in FIG. 2, the access definition architecture 58 provides two approaches to assign access rights of a consumer or user 68 to a protected resource, namely, basic entitlements 80 or smart rules 82. Basic entitlements 80 and smart rules 82 will now be described in more detail.

Figure 3:
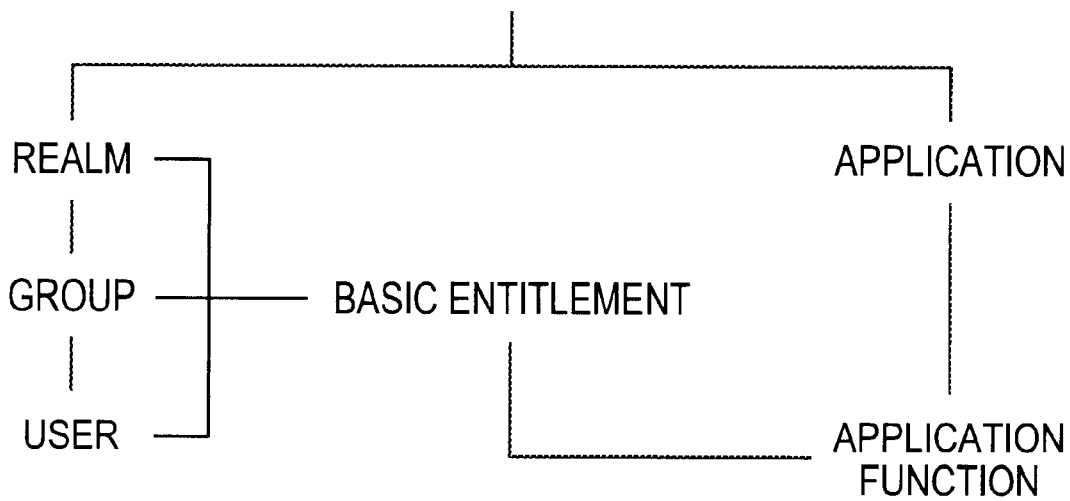
FIG. 3 illustrates the data model architecture of the security and access management system for basic user entitlements.

Referring to FIG. 3, a basic entitlement 80 is analogous to an access control list (ACL). A basic entitlement 80 directly allows or denies a specific user 68, group 76, or realm 78 access to a resource, such as an application function 84. Basic entitlements 80 assigned at the group or realm level grant access to the contained objects. Thus, if a group 76 is assigned access rights to a resource through a basic entitlement 80, all of the users 68 contained within the group object have access rights to the resource as well.

While basic entitlements 80 are a relatively straightforward and effective approach to define access rights, this approach is hindered by the fact that access rights need to be assigned and maintained manually. Consequently, as users 68 are added or modified, an administrator needs to manually modify the basic entitlement 80.

A more sophisticated approach is to define accessibility rules to a resource. As shown in FIG. 2, the access definition architecture 58 refers to these rules as smart rules 82.

Figure 4:
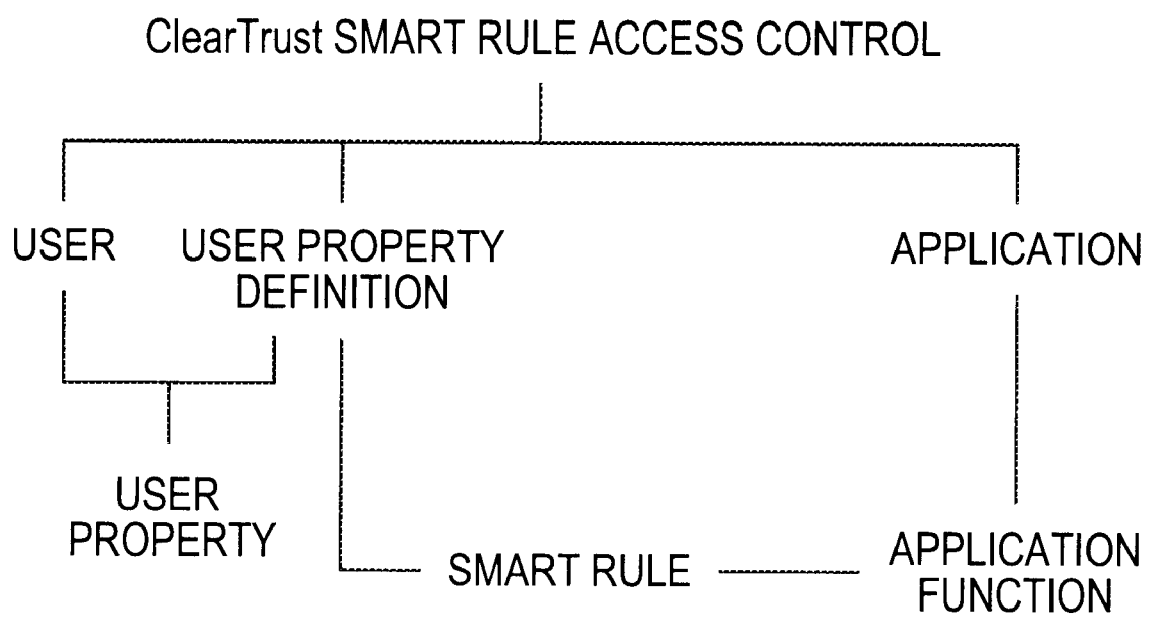
FIG. 4 illustrates the data model architecture of the security and access management system for one embodi

Referring to FIG. 4, a smart rule 82 defines accessibility by specifying a criterion which a user property definition 72 for a user 68 must meet for the user to be granted access to an application function 84. Smart rules 82 are expressions such as: "DENY if a property is less than a certain value." Smart rules 82 can also be strung together to form complex expressions.

A smart rule 82 has three resultants: ALLOW; DENY; or REQUIRE. ALLOW states that if the smart rule 82 is satisfied, permit the user 68 to access the resource without any further rule processing. DENY states that if the smart rule 82 is satisfied, forbid the user 68 access without any further rule processing. Since ALLOW and DENY are mutually exclusive rules, the access definition architecture 58 provides a mechanism to specify whether ALLOW or DENY takes precedence. Finally, REQUIRE states that if the smart rule 82 is satisfied, continue to the next smart rule, if any, to determine accessibility; however, if the current smart rule is not satisfied, DENY the user 68 access.

Referring again to FIG. 2, the resource definition architecture 60 comprises an application architecture 86 which groups protected resources into applications 88. A Web-based application 88 is comprised of Uniform Resource Identifiers (URIs) 90. Other types of applications do not have resources directly contained in the application; rather, the application represents implicitly a group of resources. Applications 88 also have associated application functions 84, which represent the various services associated with an application.

A user 68 is granted rights to an application 88. However, the security and access management system 10 actually does not assign rights at the application level, but assigns access rights to an application function 84. This is a powerful mechanism. Associating rules and rights at the application function level, instead of at the application level, provides greater security granularity.

By default, when an application 88 is created, the application has one application function 84, namely, ACCESS. The ACCESS function is used by enabled Web server objects 92 to determine access rights of a user 68 to an application 88. However, an administrator can add additional application functions 84 to the application 88 through the API client 22. The additional application functions 84 can further define whether or not a user 68 has privileges to use various services associated with an application 88. The access rights to these additional application functions 84 can be determined through the API server 16.

For a Web-based application 88, the application can contain URIs 90. Associated with a URI 90 is a defined Web server object 92 which owns the URI. Together, the URI 90 and Web server object 92 combine to form a Uniform Resource Locator (URL). The Web server object 92, besides identifying the location of a URI 90, also defines the identity of an enabled Web server 20 shown in FIG. 1. Thus, when a URL is requested from an enabled Web server 20, both the URI 90 shown in FIG. 2 of the requested URL and the identity of the enabled Web server define the application 88 being referenced. The ACCESS application function 84 of the referenced application 88 is used for determining accessibility to the requested URL.

For example, consider the situation in which a customer account application has varying functionality depending on the service contracts with customers. Consequently, a service contract provider wants all of its customers to be able to access the customer account application, but return an interface supporting only the level of functionality that matches the service contract of the customer. In order to accomplish this, an administrator of the service contract service provider would create an application 88, for example, denoted CustomerAccountApplication. Next, the administrator would define the URI 90 of the application 88, /customeraccountapp.cgi, and a Web server object 92 which owns the application, for example, WebServer. The administrator would then define application functions 84 representing the various functionality of the CustomerAccountApplication. The administrator associates either a basic entitlement 80 or a smart rule 82 with the ACCESS application function 84 and each additionally defined application function.

During a request for the CustomerAccountApplication, the enabled Web server 20 processes the ACCESS application function 84 to determine accessibility to the application 88. Once a user 68, that is, a service contract customer, is granted access, the customer account application uses the API server 16 to determine the different application functions 84 to which the customer has access rights, and returns the correct interface which supports the function set.

Finally, as shown in FIG. 2, the administrative architecture 54 provides a flexible model for defining ownership and administrative responsibilities of data model architecture objects. On the one hand, ownership can be used to segment objects by their geographical location, organizational structure, or other logical grouping to limit access by an administrator to only objects in his or her area of responsibility. An area of ownership is defined as an administrative group 94. For example, an administrator can be defined that can modify only objects in the North American Administrative Group.

Additionally, the capabilities of an administrator can be restricted. For example, an administrator can be limited to modifying only users 68 and user properties 70 within the North American Administrative Group. As shown in FIG. 2, a set of capabilities or privileges of an administrator is defined by an administrative role object 96.

Consider the following example. A company is using the security and access management system 10 to protect its external customer account application, but it is protecting its internal human resource (HR) information as well. In order to manage administration of the entitlements database 32, the company can define two administrative groups 94, namely, Customer Administrative Group and HR Administrative Group. Next, the company can define two administrative roles 96, Customer Admin Role and HR Admin Role, granting each administrative role a full set of administrative privileges.

The security and access management system 10 comprises advanced, intelligent web security and access control software. The security and access management system 10 includes a wide array of powerful features, controlled through a streamlined and intuitive graphical user interface, providing administrators complete control over the intranet. The security and access management system 10 offers unparalleled flexibility in intranet security for the enterprise. The security and access management system 10 can be adapted to any security philosophy or corporate structure, and is truly scaleable. That is, the security and access management system 10 can meet the security needs of a department, division, or an entire corporation. The security and access management system 10 is preferably implemented using a Java-based construction so that the software will run on any server in a computer network, and protect all Web applications, all the time. Furthermore, the security and access management system 10 is designed to work seamlessly with the top names in enterprise computing, including products from companies such as Microsoft, Sun Microsystems, and Netscape.

The security and access management system 10 provides intranet security by controlling access to Web applications and data. Using the security and access management system 10, a security administrator can define and describe the user population on the intranet, all of the applications contained on the computer network, and the relationships between them. The security and access management system 10 also offers unmatched administrative flexibility. An organization using the security and access management system 10 to secure intranet applications can implement and enforce any suitable security policy. Using two simple concepts, the user and the application, the security and access management system 10 provides owners of enterprises the opportunity to apply the strongest security available to the intranet and extranet.

The layout and functionality of each panel of the graphical user interface of the security and access management system 10 will now be described. Also included are brief explanations of each basic function of the security and access management system 10.

The security and access management system 10 defines a number of concepts in conjunction with security administration. The following glossary lists the most common terms.

User means a single user of Web applications protected by the security and access management system 10, using various user properties such as username, password, e-mail address, IP address, etc. Group means a collection of users, grouped together for ease of administration. Groups have specific properties. A realm is a collection of groups. A realm contains all of the users within the component groups of the realm. Entity means a user, group, or realm.

Application means any Web application protected by the security and access management system 10. An application can be a collection of any number of Web resources or "pages." A resource is a single component or "page" of a Web application, characterized by having a single URI. URI means Uniform Resource Identifier which identifies the resource that is protected, such as http://www.sirrus.com, and is a more generic term than the more common URL. The security and access management system 10 views a Web server 20 as a container for Web applications. A Web server 20 can contain any number of Web applications, and the security and access management system 10 can protect any number of Web servers. In addition, a Web application can span multiple Web servers 20A, 20B, 20C seamlessly.

An entitlement is a relationship between an entity and an application. An entitlement gives a user access to an application on the Web. An administrator is an individual who creates and maintains entities, applications, and entitlements on the intranet. In comparison, a sub-administrator is a type of user that can perform limited administrative tasks via the security and access management system 10, as designated by the administrator.

An administrative group is a set of ownable resources that is configured to be under the control of a particular set of administrators. Administrative role means a role defining the types of operations an administrator can perform on a particular administrative group. An ownable resource is one of all of the types of resources defined in the security and access management system 10, which can fall under the control of an administrative group. They are: user, group, realm, application, Web server, administrative roles, and user property definitions. Other resources, such as entitlements and smart rules, are owned by default by the group that owns the related application, property, or user/group/realm.

As mentioned earlier, the security and access management system 10 encompasses various concepts. These concepts include users, groups, and realms.

Many enterprises or organizations deal with hundreds, or indeed thousands, of computer users. Administering security to each of these users one by one would be a daunting and unpleasant task. Preferably, the security and access management system 10 incorporates the concept of grouping users together to facilitate administration.

A group is a collection of users. Any action applied to a group is automatically applied to every user in that group. Consequently, granting a group access to an application automatically gives each user in that group access to that application. The same rule applies for restricting application access and various other features. The exception to this rule is deleting a group. If a group is deleted, the users in that group are no longer members of that group, and none of the security settings applied to that group continues to apply to those users. However, deleting a group does not delete any of the users in that group. Users must be deleted individually to remove their information from the entitlements database 32 and make them unavailable to the administrator.

A realm is a collection of groups. As in the case of groups, an administrative action applied to a realm is automatically applied to all of the groups contained in the realm, and to all of the users within those groups. Again, this is not the case with deleting a realm. Deleting a realm does not delete the groups contained in that realm, or the users within those groups.

Another important feature of the security and access management system 10 is that permissions become more powerful as the number of users being administrated decreases. Therefore, a privilege granted or denied to a particular user overrides a conflicting permission given to a group or realm. Similarly, permissions set at the group level override permissions given to a realm. For example, if a user is granted permission to use the marketing application at the user level, he or she can use that application even if he or she is in a group or realm that is denied that permission.

Additionally, the security and access management system 10 enables administrative groups and administrative roles to be defined to offer flexibility to security administrators. Administrative groups and administrative roles offer tremendous administrative control to an organization, and can adapt to any security structure.

Rather than assign specific duties to an individual, the security and access management system 10 allows the creation of an administrative role which is a set of administrative privileges and responsibilities. Users can then be added to or deleted from that role. In this way, a number of users is able to perform the duties of, for example, the marketing administrator. Keeping administrative duties separate from personnel allows an enterprise or organization to maintain a constant, coherent security policy under any conditions.

Figure 5:
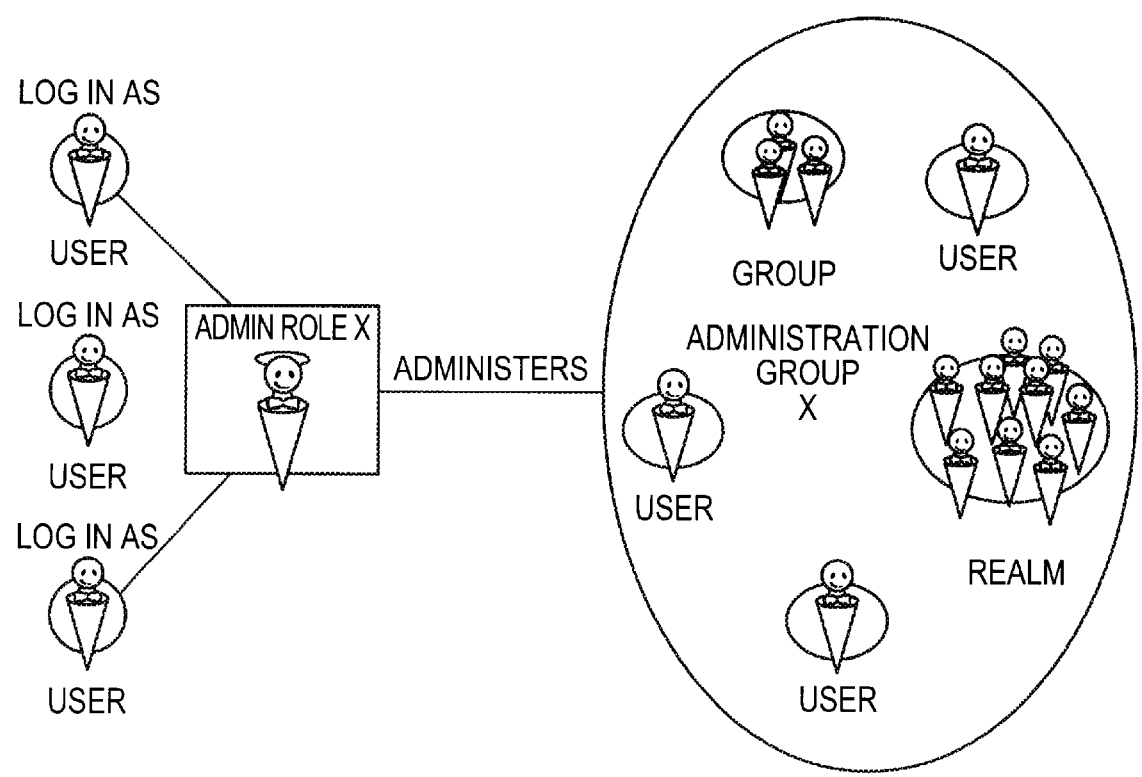
- FIG. 5 illustrates the administrative structure of the security and access management system in accordance with the present invention.

In the same way an administrative role dictates which features are under the control of an Administrator, an administrative group dictates which ownable resources are under the control of an administrator. Each administrative role is associated with a corresponding administrative group. Every member of an administrative group can be modified or deleted, or have privileges created, modified, or deleted, by a user in an administrative role with appropriate administrative privileges. FIG. 5 illustrates the administrative role/administrative group concept.

As shown in FIG. 5, a user can be associated with any number of administrative roles. An administrative role can be associated with any number of users. An administrative group can contain any number of users, groups, or realms.

An administrative group can be associated with any number of administrative roles, which facilitates sub-administration. One administrative role can have complete control over the administrative group, while others have limited control. Note that this relationship does not operate in the reverse. That is, an administrative role can only be associated with one administrative group.

Figure 6:

The operation of the administrative client 18 shown in FIG. 1 will now be described. Initially, the entitlements manager software for the security and access management system 10 is launched, which causes a login window to be displayed, as shown in FIG. 6. In the case that the security and access management system 10 is running on a Windows 95/NT platform, there are two options to launch the entitlements manager. The first option is to select an entitlements manager icon from the start menu→programs. The second option is to double click a clrtrustmgr.bat file under the directory for the entitlements manager for the security and access management system 10. In the case that the platform is a UNIX platform, a shell is opened and clrtrustmgr under the client installation directory for the security and access management system 10 is run.

Referring to FIG. 6, the user is presented with a login window asking for a User ID and Password. The user has three attempts and sixty seconds per attempt to enter a valid user identification/password combination. If the user enters invalid information on four consecutive attempts or the timer expires, the application shuts down.

Figure 7:
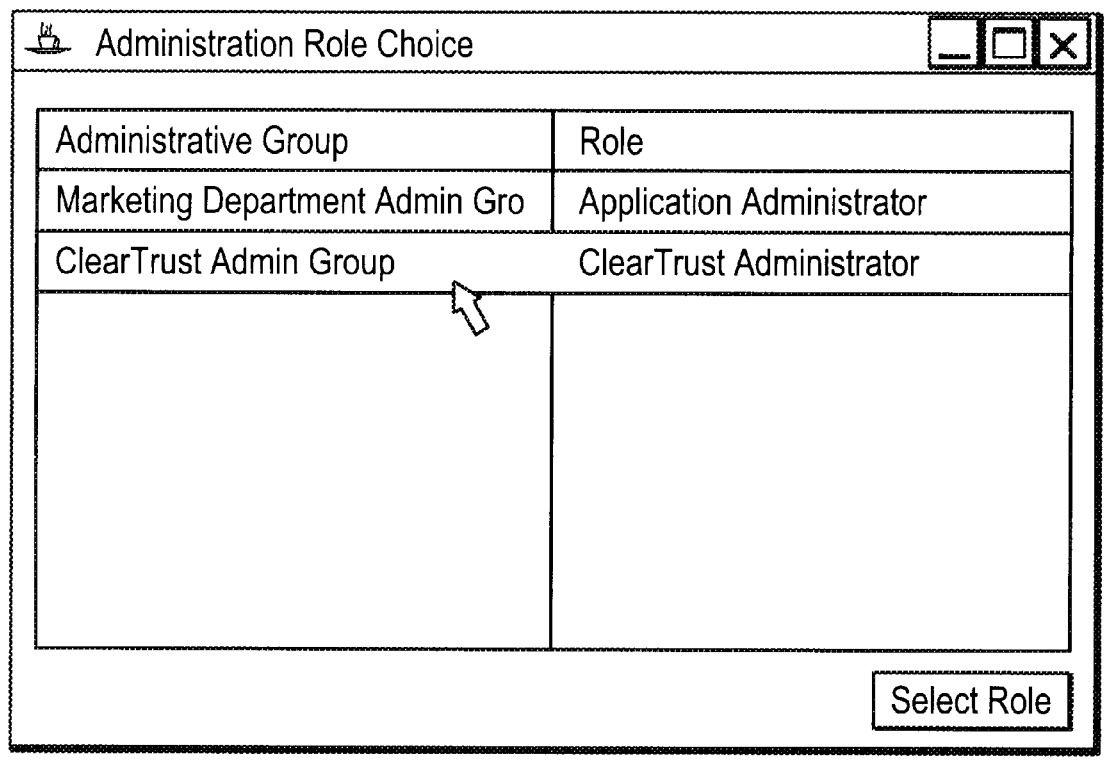

Once the correct user ID and password have been entered, as shown in FIG. 7, a role selection window appears if the user has administrative privileges under two or more roles. This window displays all of the administrative roles available to that user. For example, the administrator may wish to work with marketing employees and applications. Thus, he or she would select the marketing department administrator role. As the window indicates, the corresponding Administrative Group is the "Marketing Department." Administrative roles and groups will be described in more detail later in connection with the description of the Administrators page. Once the administrator has selected an administrative role by highlighting that role, clicking the Select Role button opens the main window.

Figure 8:
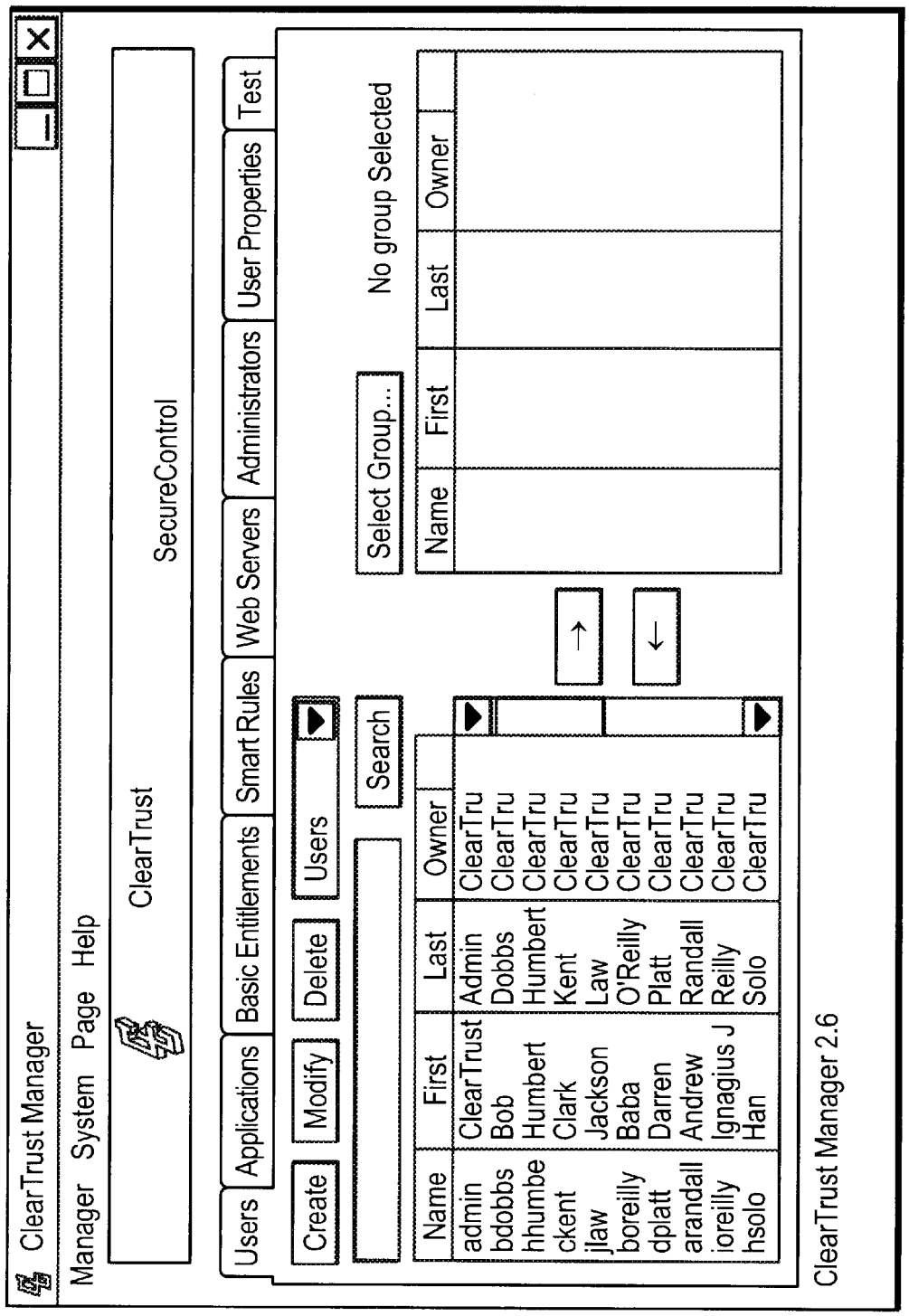

Referring to FIG. 8, the main window displays tabs for each of the available functions. In addition, the main window offers various menu choices which will now be described.

The Manager menu allows the administrator to exit the security and access management system 10. The System menu contains a Cache Flush command. Executing this command will make the rest of the system aware of any changes. In order to maintain the highest possible performance, the security and access management system 10 employs a great deal of caching of information on the server. The Cache Flush command will cause the server to update the caches to reflect the new information that has been entered. It is not necessary to run this command for every change that is entered. The command can be performed at the end of a session if desired. Note that there is not an automatic cache flush. The cache must be flushed manually for changes to take effect. Also, all changes made through the API are also propagated throughout the security and access management system 10. The Page menu allows the administrator to jump from page to page. Selecting a particular page in this menu will bring the page up in the entitlements manager. The Help menu contains documentation for each of the panels of the interface.

Much of the security provided by the security and access management system 10 is based on the concept of the user, the individual person who requests access to the applications being secured by the security and access management system 10. Referring to FIG. 8, the Users page is brought up by clicking on the Users tab.

The security and access management system 10 allows a security administrator to create an unlimited number of users, each with individual defining properties. The administrator can further collect users into groups and groups into realms. Additionally, users can be in multiple groups. This feature is useful for administrators trying to mimic organizational structure (for example, user John Doe may be in the promotions group, which is in the marketing realm) or geography (user Jane Doe is in the Paris group, which is in the Europe realm), or any other type of grouping. The user/group/realm concept is also important for setting permissions and entitlements, as will be described later in connection with the description of the Basic Entitlements page.

In order to find a particular user, group, or realm in the list box, an administrator can scroll through the list of entities or use the Search function. In order to use Search, the administrator enters the desired name or name fragment in the field, and clicks the Search button. If a full name is typed into the Search field, that name will automatically appear at the top of the list box. If a fragment is typed into the Search field, the first name beginning with that fragment will appear at the top of the list box. The Search function is indexed differently depending on the type of entity selected. For users, the Search function indexes on last name. For groups and realms, the Search function indexes on the group or realm name.

Figure 9:

Users logged in using administrative roles with the proper permissions can create users, groups, or realms. In order to create a user, Users is selected in the entity menu. Clicking the Create button brings up the Create User dialog window, as shown in FIG. 9.

When creating a user, the following information is required. As shown in FIG. 9, a User ID is required. The User ID is the login ID for the user. Also, the first and last names of the user are required. Additionally, Account Start and Account Expiry dates are required.

Figure 10:
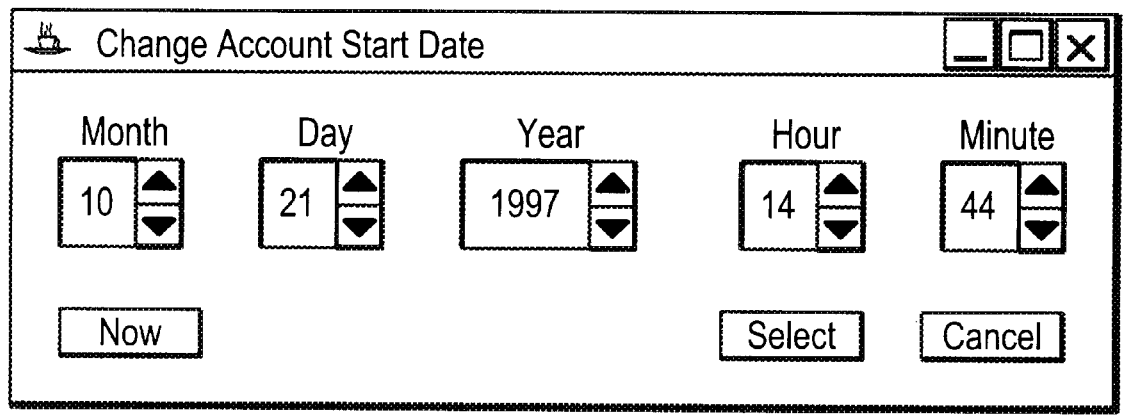
Figure 11:
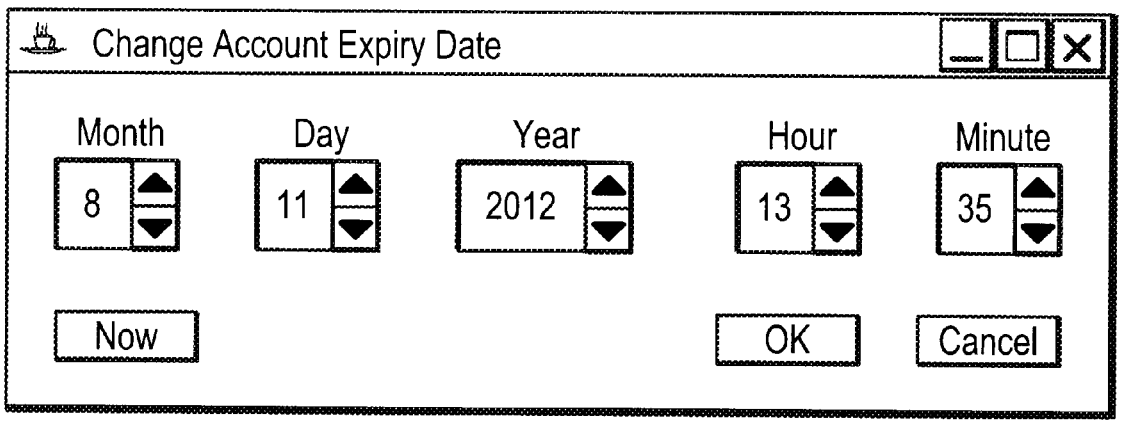

Clicking the Set button for either of these properties brings up a date set window, as shown in FIGS. 10 and 11 for the Account Start and Account Expiry dates, respectively. Using these windows, the Account Start Date and Account Expiry Date can be set by selecting the desired date and time and clicking the Select or OK button. In order to automatically enter the current time and date, the Now button and the Select or OK button are clicked in sequence. The times set using these windows refer to the time zone of the host machine.

If the times are not explicitly set, the Account Start and Account Expiry times are set to the system default times when the user is created. The default Account Start time is the moment the new user is saved, as read from the host machine, and the default Account Expiry time is six months from the Account Start time.

Referring again to FIG. 9, the Create User window comprises a Private checkbox. When creating a user, the administrator can designate that user public or private. A private user can only be seen and manipulated by the administrator or administrative role that created the user. A public user can be seen, though not necessarily modified, by any administrator. Users are by default public. Users can be designated private by checking the Private checkbox.

The Create User window also comprises a Super User checkbox. A user must be an administrator to be designated a Super User. If a user is both an administrator and a Super User, he or she can perform any action on any user, group, realm, or application. Care is typically exercised when applying Super User status to administrators.

Figure 12:
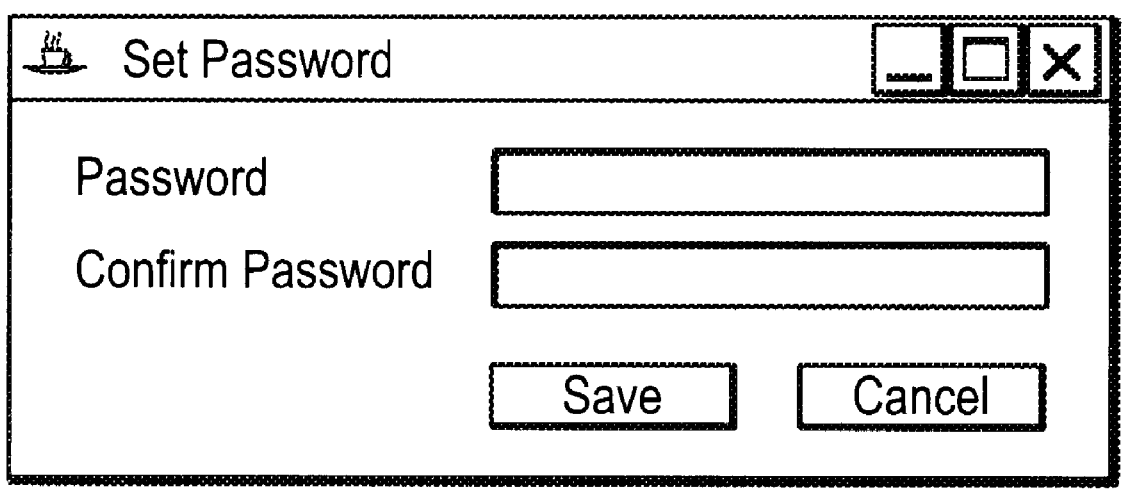

Referring to FIG. 9, clicking the Set Password button brings up the Set Password dialog window, as shown in FIG. 12. The fields in this window are always empty, even if a password has already been set. In order to enter a new password or change an existing one, a new password is entered and confirmed, and the Save button is clicked. Clicking the Cancel button aborts the password change. Note that, initially, a user has a default password specified at installation.

Finally, user properties can only be set for an existing user. Referring again to FIG. 8, in order to set a property for a new user, the user is selected from the User list, and the Modify button is clicked to bring up the Modify User dialog window which is similar to the Create User window shown in FIG. 9, but contains the information that was entered when the user was created. The Property list contains all of the properties available for the selected user. In order to change a property Value, the Property is selected, and the Change Property Value button is clicked. The Enter Property dialog window then appears. A value can be entered for the property. The security and access management system 10 only allows valid property values to be entered, based on the property type (True or False for Boolean properties, integers for integer properties, real numbers for floating-point properties, dates for date properties, character strings for string properties, and null for properties that can be set to null). The modified user can then be saved.

Figure 13:
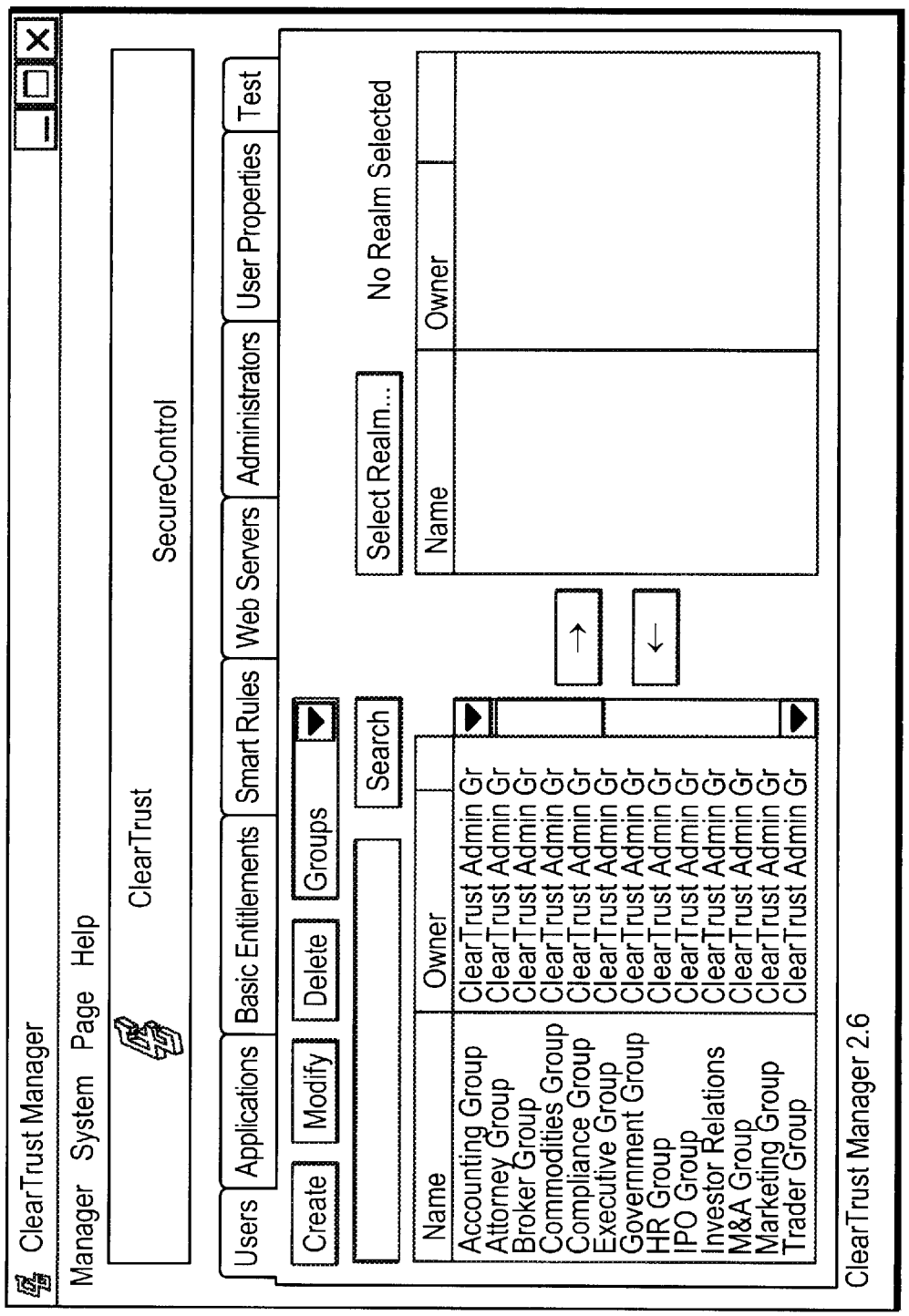
Figure 14:
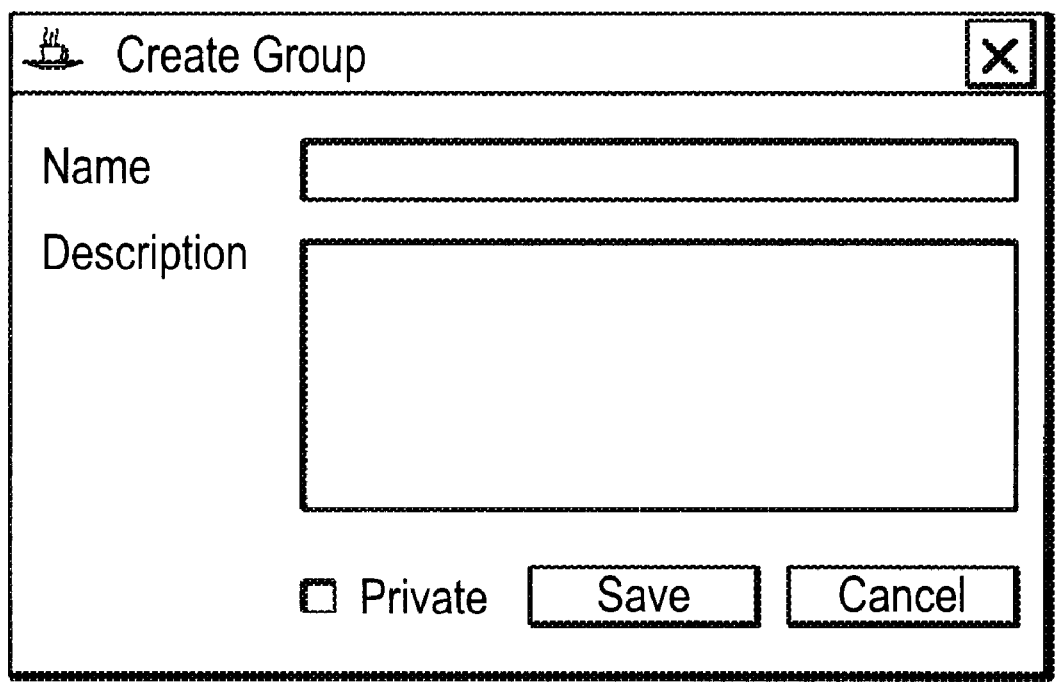

In order to define a group, a Group page is brought up when Groups appears in the entity menu, as shown in FIG. 13. The Create button is clicked to bring up a Create Group dialog window, as shown in FIG. 14. When creating a group, the administrator supplies the following information. The Name of the group is required. Also, the administrator can provide an optional Description of the group.

Figure 15:
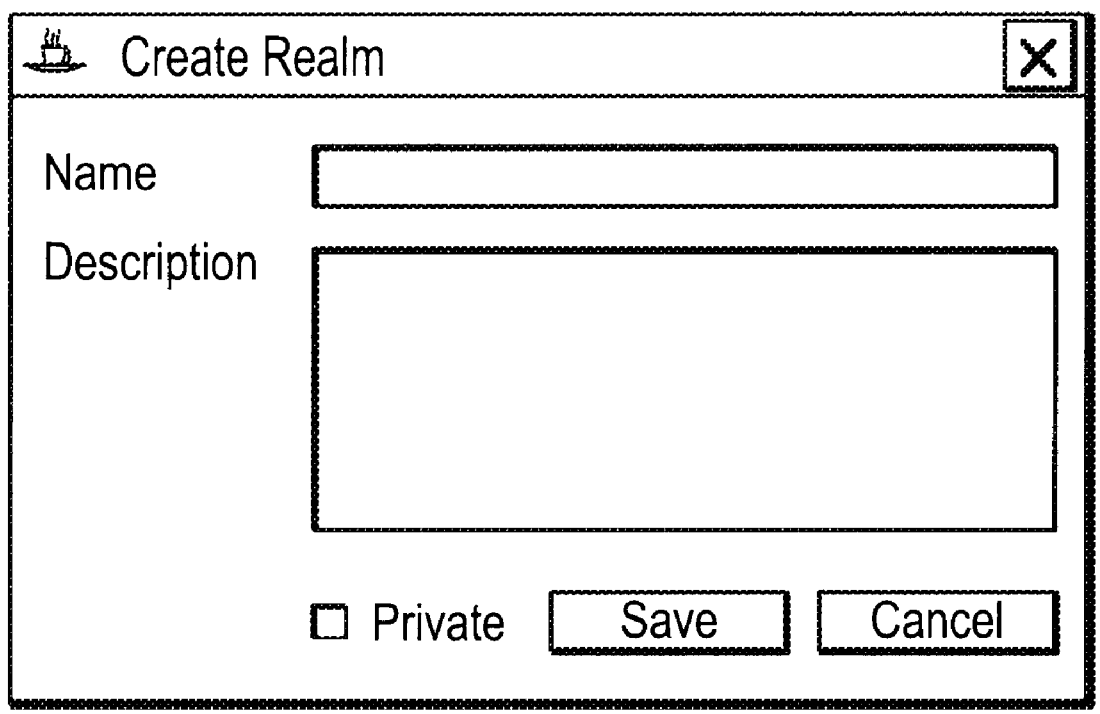

Similarly, in order to define a realm, a Realm page similar to the Group page shown in FIG. 13 is brought up. The Create button is clicked to bring up a Create Realm dialog window, as shown in FIG. 15. When creating a realm, the administrator supplies the following information. The Name of the realm is required. Also, the administrator can provide an optional Description of the realm.

When creating a user, group, or realm, an administrator should be aware of his or her current administrative role and the administrative group associated with that role. Any user, group, or realm created is automatically associated with that administrative group. Consequently, if an administrator can create users as both the marketing administrator and the engineering administrator, for example, it is preferable to create marketing and engineering users while working in the appropriate roles.

When groups and realms are created, they are "empty." That is, a new group does not contain any users, and a new realm does not contain any groups. Similarly, new users are "empty" when they are created. They are not members of any group, they do not have any specified entitlements, and they do not have any properties.

On the one hand, in order to add users to a group, Users is selected in the entity menu. The user list appears in the entity list box. Then, the Select Group button is clicked. The Group List dialog window will appear. The group to be populated is then selected, and the OK button is clicked. In order to include users in that group, the user to be added is highlighted to select the user, and the Add Arrow button is then clicked.

On the other hand, in order to remove users from a group, Users is selected in the entity menu, and the appropriate group is also selected, as described above. The user to be removed is then highlighted to select the user from the Group Members list box. In order to remove the selected user, the Remove Arrow button is then clicked.

Adding groups to realms and removing groups from realms is similar. When Groups is selected in the entity menu, the Select Group button automatically changes to read Select Realm. The Select Realm button is clicked, and the realm to be changed is selected from the realm list dialog window. In order to add a group to that realm, the group to be added is highlighted to select the group, and the Add Arrow button is clicked. In order to delete a group from the realm, the group to be removed is highlighted to select the group, and the Remove Arrow button is clicked.

In order to edit a user, group, or realm, Users, Groups, or Realms is selected from the entity menu. All of the available entities of that type then appear in the list box below. The user, group, or realm to be modified is then highlighted to select the entity, and then the Modify button is clicked. The Modify dialog window appears. The Modify dialog window is identical to the Create dialog window, but contains all of the current user/group/realm information, which can be edited. Once the fields in the Modify dialog window have been changed, OK is clicked to complete the Modify, or the Cancel button is clicked to abort.

In order to delete an entity, the appropriate entity type (Users, Groups, or Realms) from the entity menu is selected. Then, the entity or entities to be deleted from the list box are highlighted. The Delete button is pressed to delete the user, group, or realm.

Deleting a group or user is different from removing a group from a realm, or a user from a group. A deleted group is gone. The component users still exist, but the group information is deleted, and any entitlements applied to that group are deleted as well, and the group is automatically deleted from any realm which contained that group. A group removed from a realm still exists. However, the group is simply no longer governed by entitlements applied to that realm. Similarly, a deleted user is gone. All of the user information is removed from the entitlements database 32. Deleting a user automatically removes that user from all groups, and a deleted user cannot be added to any group. A removed user is no longer a member of that group, but is still in the entitlements database 32 and is available to be added to any group. Consequently, care is typically exercised when deleting users, groups, or realms.

Figure 16:
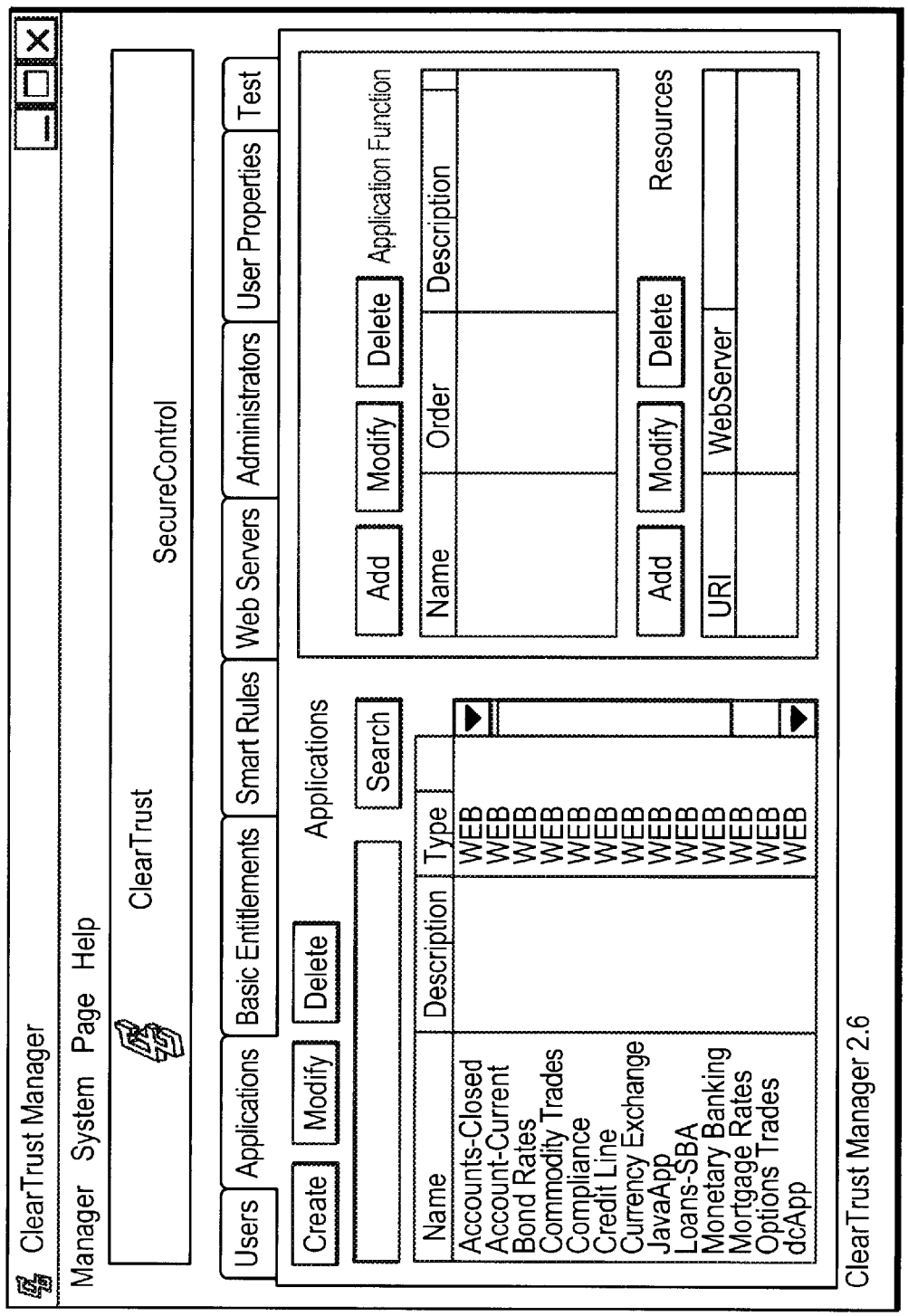

Referring to FIG. 16, the Applications page is employed for administrators to define the Web applications available to users of the security and access management system 10. Each application is comprised of an unlimited number of resources. Each resource is defined as a particular Web "page" or URI. Thus, an application can have one resource devoted to calculation, one to printing, one to saving, etc.

The Applications page shown in FIG. 16 is also used to create application privileges. These privileges are most easily explained by example. The most basic application privilege is access. If a user has the access privilege granted for a certain application, he or she can navigate to that application on the intranet. Otherwise, the security and access management system 10 does not allow the user to access that application. Every application has the access entitlement by default. Other application entitlements can control other aspects of the functionality of the application. An application can have a print entitlement, or a save entitlement, for example. The user can be allowed to download appropriate applets based on permissions managed by the security and access management system 10. Application entitlements dictate the level of control that the administrator has over application access. Applications with only the access entitlement are completely available to anyone with that entitlement. Applications with entitlements for each of their various functions allow finer-grained control.

Referring to FIG. 16, in order to create a new application, the Create button is clicked. This brings up the Create Application dialog window. The administrator can then specify the following application properties. One application property is the Name of the application. Another property is a short Description of the Web application. A final property is a Type for the application, which is generally set to WEB, unless the installation of the security and access management system 10 has special connections to other application systems.

Applications can also be modified by the administrator. Clicking the Modify button brings up the properties of the selected application. These properties can then be changed and saved. Clicking the Cancel button aborts the modification.

Pressing the Delete button automatically deletes the selected application. Deleting an application deletes all of the resources associated with that application. If an application is deleted from the security and access management system 10 and the Web "pages" referred to by that application still exist on the intranet, those pages will no longer be protected by the security and access management system and may be available to any user. Therefore, care is typically exercised when deleting a Web application.

As described earlier, resources are the component parts of each application. Referring to FIG. 16, clicking the Add button above the Resources window brings up the Create Resource dialog window. There are two ways to define a resource. One option is to enter a complete resource URI (/hr/benefits/copay/lookup.html, for example). The other is to use wildcards (/hr/benefits/copay/*.html or /hr/benefits/*). The resource must also be associated with a Web server 20 defined using the Web Servers page.

Pressing the Delete button above the Resources window deletes the highlighted resource. As in the case of applications, resources that are deleted from the security and access management system 10 but still exist on the intranet are no longer under the protection of the security and access management system and may be accessed by any user.

When new applications are created, all new applications have the access function by default. In order to create a new function, the appropriate application is highlighted in the application list, and then the Add button above the Application Function list is clicked. The Create Function dialog window will appear so that the new function can be defined.

In order to delete an application function, the function to be deleted is highlighted in the Application Function list. Then, the Delete button is pressed.

The security and access management system 10 controls access to applications through a system of entitlements. An entitlement grants a particular user access to a particular Web application function. Without the related entitlement, the security and access management system 10 does not allow a user to navigate to that application.

Figure 17:
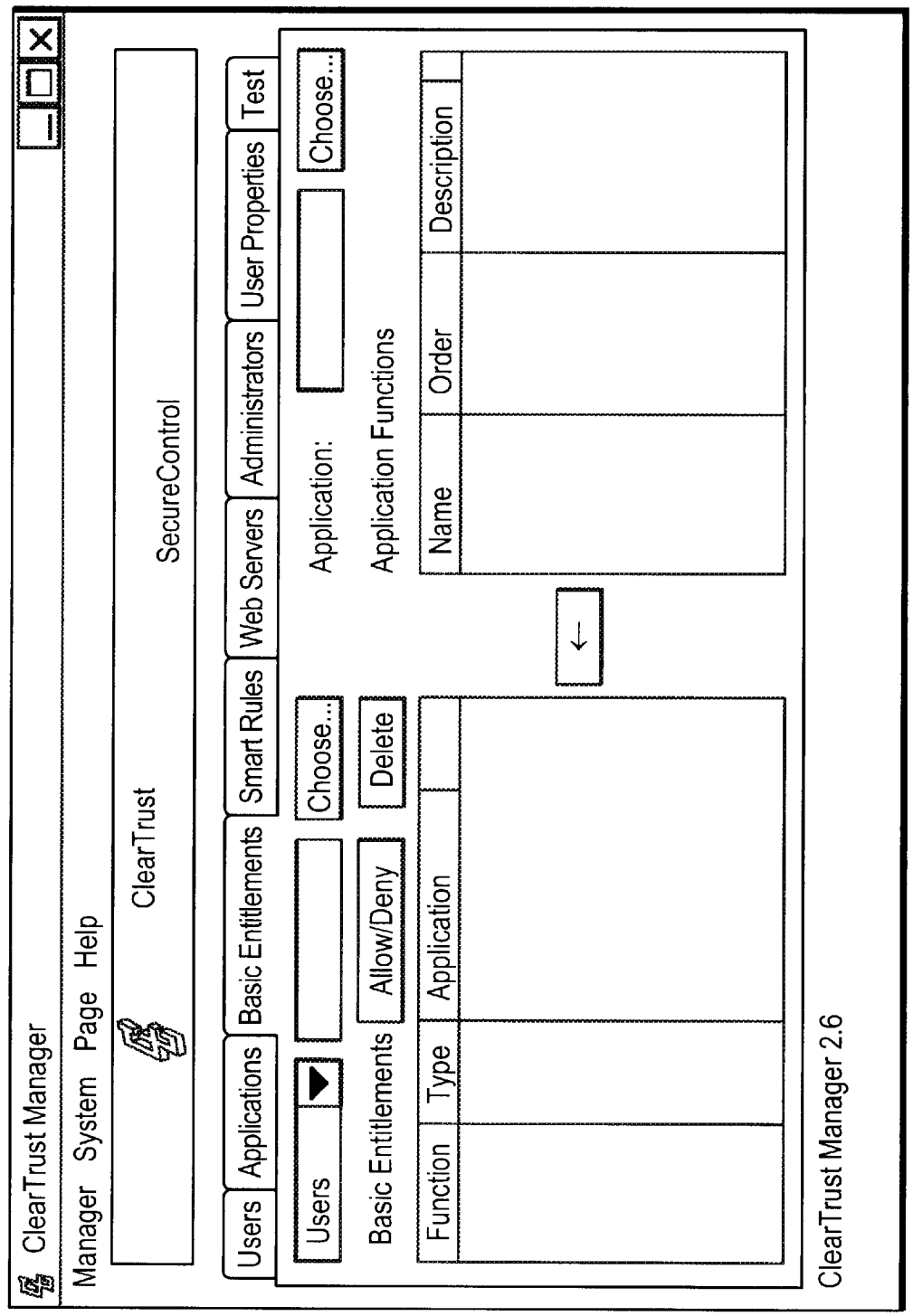

Entitlements are defined and administered using the Basic Entitlements page, as shown in FIG. 17. By adding entitlements using the security and access management system 10, entitlements to particular applications can be assigned to users, groups, or realms with ease. First, the administrator selects the user, group, or realm to be granted the entitlement. This is similar to the selection process on the Users page, described earlier. The appropriate entity is then selected from the entity menu. Clicking the left Choose button brings up a list of all available users, groups, or realms. The entity to be administered is selected from this list, and the Choose button is clicked. All of the entitlements for the selected user, group, or realm appear in the Basic Entitlements list box.

When the appropriate entities have been selected, the Application to be administered is selected by clicking the right Choose button and selecting the application from the list box that appears. When an Application has been selected, all of the available application functions appear in the Application Functions list box.

In order to grant a Basic Entitlement to the selected user, group, or realm, the appropriate application function is highlighted, and the Left Arrow button is clicked. The application name, function name, and default entitlement setting (Allow or Deny) will then appear in the Basic Entitlements list box for the user.

Basic entitlements can be modified. In order to change an existing basic entitlement, the entitlement is selected, and then the Allow/Deny button is clicked. This will toggle the selected entitlement from Allow to Deny.

Basic entitlements can also be deleted. In order to delete an entitlement for the selected user, the entitlement to be deleted is highlighted, and then the Delete button is pressed. This will only delete the entitlement setting for the entity in question. That entitlement can be granted to the entity again, if necessary.

If a basic entitlement for a user is deleted, the access privileges of that user to that application function revert to the next available setting. If the user is in a group or realm with basic entitlements set for that application function, those privileges apply. If that is not the case, default settings apply.

When a basic entitlement for a group is deleted, users in that group, who do not have basic entitlements set, revert to the default entitlement settings for that application function. Since entitlements at the user level override entitlements at the group level, users with basic entitlements set see no change in their access ability.

When basic entitlements for a realm are deleted, access privileges for users in groups in that realm are determined by the appropriate user entitlements settings (if they exist), group entitlements settings (if they exist), or default entitlements settings, in that order.

Smart rules are filters that govern user access to applications. When a smart rule is defined for an application, in order to determine authorization, the security and access management system 10 examines a property for a specific user, and grants or denies access to an application resource based on the value that is found. For example, smart rules can be used to restrict access to a particular function to users whose "Contract ID" property is above "1000," or whose "Department" property equals "accounting," or whose "SpeaksFrench" property is True. In order to create a smart rule, the related applications, resources, and user properties must already exist.

Smart rules can be used to allow or deny access. Smart rules can be defined as one of three types, namely, Allow, Require, or Deny.

The first type of smart rule is Require. The Require rule requires a specific condition to be met before an entitlement can be granted.

The second type of smart rule is Deny. The Deny rule denies an entitlement if a specific condition is met.

The third type of smart rule is Allow. The Allow rule grants an entitlement that would otherwise be denied, if a specific condition is met.

Figure 18:
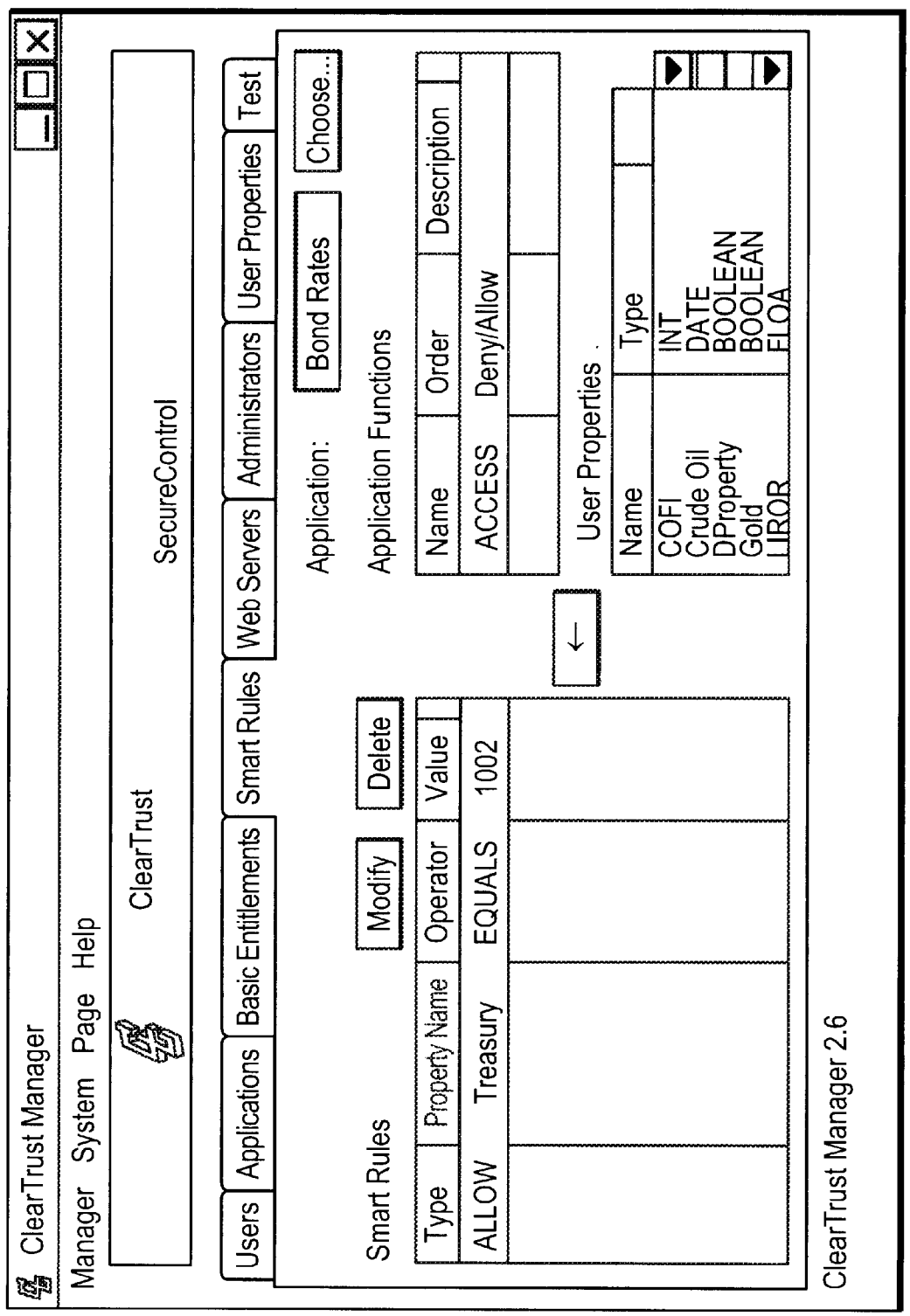

Various steps are required to create a smart rule. Referring to FIG. 18, the first step in creating a smart rule is selecting the Application for which the smart rule is to be created. Clicking the Choose button brings up a list of all available applications. The desired application highlighted, and then the Select button is clicked to choose the application.

The application list will disappear, and all of the application functions for the selected application will appear in the Application Functions list box. The function to which the smart rule is to apply is then selected. From the User Properties list box, the user property to be examined is selected. In order to create the entitlement, the Left Arrow button is clicked. This brings up the smart rules filter box, as shown in FIG. 19.

Figure 19:
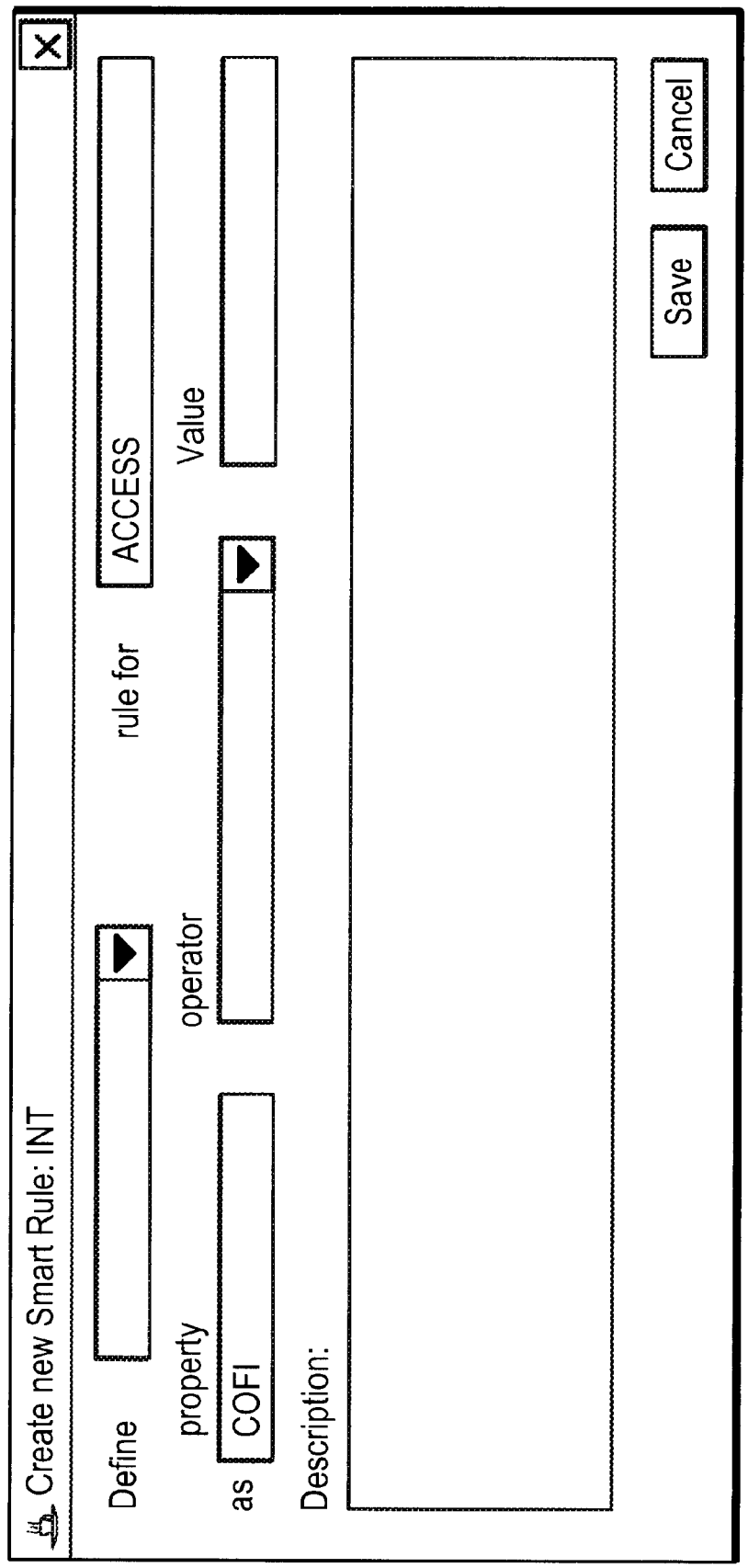

The smart rules filter box shown in FIG. 19 is employed to create a filter. A filter comprises four components, namely, a rule type, a property, an operator, and a Value. The rule is selected from the rule list, which is a pull-down list beside the word Define. As described above, the rule is either Require, Deny, or Allow. The property is the property selected on the smart rules main page shown in FIG. 18. The operator is selected from the operator pull-down menu. The available operators depend on the type of property. Integer properties (INT) have mathematical operators, such as >(greater than); <(less than); =(equal to); !=(not equal to); >=(greater than or equal to); and <=(less than or equal to). Floating-point properties (FLOAT) have the following mathematical operators: >(greater than); <(less than); =(equal to); !=(not equal to); >=(greater than or equal to); and <=(less than or equal to). Boolean properties (BOOL) are either True or False. Their operators are IS or IS NOT. String properties (STRING) have the following operators: Contains, Does Not Contain, Ends With, Starts With, and Equals. Finally, date properties (DATE) have two operators, namely, BEFORE and AFTER. The BEFORE and AFTER properties are not inclusive. For example, "BEFORE Jun. 25" is any day up to and including Jun. 24, and "AFTER Jun. 25" is any day from Jun. 26 onwards.

Once the property and operator are selected, a value must be entered into the Value field. The security and access management system 10 only accepts valid values based on the property type. All of this information combines to create a smart rule, for example, "DENY access if CONTRACT NUMBER is LESS THAN 100001." As shown in FIG. 19, a short Description of the smart rule can be entered, and clicking the Save button saves the smart rule filter or clicking the Cancel button aborts.

Advantageously, smart rules can be employed to avoid having to manually grant access to thousands of individuals and then also constantly monitor privileges manually. Smart rules can be used to automate the access privilege enforcement.

The way a smart rule operates is as follows. A smart rule is defined that determines which properties (characteristics) of a user need be present in order to be given access. Smart rules function differently than a traditional Access Control List (ACL) which is simply a list of allowed or denied users, which needs constant manual updating.

Smart rules essentially build access control lists dynamically based on the properties of the users. The properties of a user are such things as "job title" or "account balance" or "premium account holder" or "trustee." Properties are nouns which are used in day-to-day business operations. These properties most often reside in existing enterprise databases, such as customer list databases or employee databases. In order for a smart rule to operate against a particular property, the smart rule must first be defined in the entitlements database 32. Then, the properties from the customer or employee database can be loaded into the entitlements database 32, and synchronized periodically to keep them up to date. This can be easily done through the bulk loading function of the API server 16. Once the user properties have been extended and populated, the process of building smart rules begins. These smart rules are dynamic, since they are applied to properties which are continually updated through the bulk loading function.

Additionally, smart rules can be grouped. There can be multiple smart rules defined for a particular application function, such as the basic function of access. The smart rules are banded together as such: Allow AA or Allow BB or Deny FF. Consequently, if a user does not meet AA or BB, he or she would be denied access. If he or she met either AA or BB (or both) but also met FF, he or she would be denied, because Deny preferably overrules Allow. However, priority of Allow versus Deny can be switched if needed. In a situation where a Require smart rule is used, even if the user met the conditions needed for Allow but did not meet the conditions for Require, he or she would be denied access, because Require smart rules are preferably the highest priority of the rules.

Figure 20:
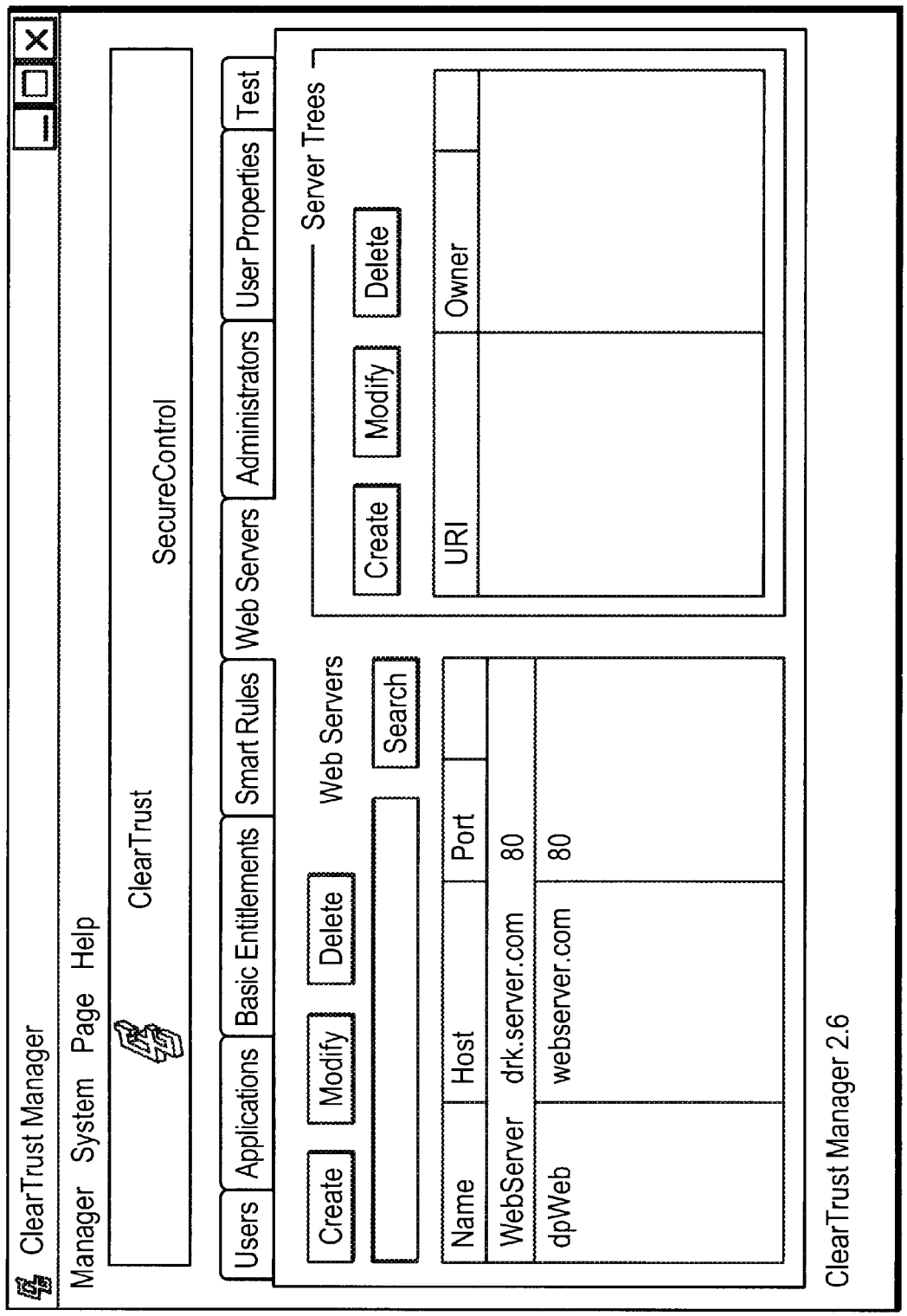

Referring to FIG. 20, the security and access management system 10 allows Web applications to be defined to span multiple Web servers 20A, 20B, 20C, and these servers therefore need to be defined to the security and access management system. Information about the Web servers 20A, 20B, 20C is purely descriptive, insofar as the security and access management system 10 is concerned. The security and access management system 10 only uses application data to protect Web applications. It can be useful, however, to designate Web applications as being on a particular Web server 20A, 20B, or 20C.

Figure 21:
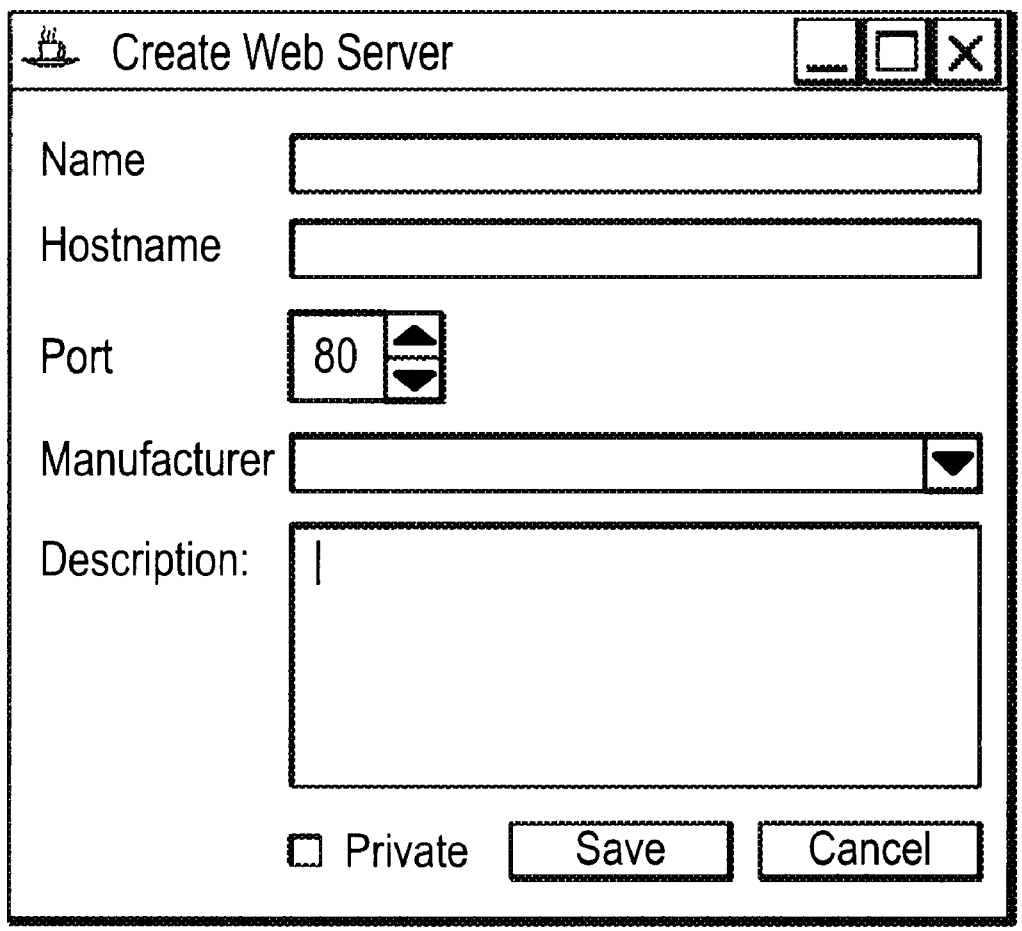

In order to create a Web server, the Create button on the Web Servers page shown in FIG. 20 is clicked. This brings up the Create Web Server dialog window, as shown in FIG. 21. Various information is specified. The unique Web server Name is specified. This is the name that the security and access management system 10 uses when looking for the Web server over the computer network. The Hostname or host IP address of the Web server is also specified. The Port number on which the Web server runs is also specified. The Manufacturer of the Web server software is additionally specified. This is a drop down list. Finally, a short Description of the Web server is preferably specified.

Once the information has been entered, the Save button is clicked to save the Web server, or Cancel is clicked to abort.

Once the Web server has been created, resources can be added to the Web server.

Clicking the Modify button on the Web Servers page shown in FIG. 20 brings up the Modify Web Server dialog window. The Modify Web Server dialog window is similar to the Create Web Server dialog window shown in FIG. 21, except that information about the currently selected Web server appears in the fields. This information can be modified as needed. Changes are saved by clicking the Save button, and aborted by clicking the Cancel button.

A Web server can also be deleted. Highlighting a Web server listed on the Web Servers page shown in FIG. 20 and pressing the Delete button deletes that Web server. Note, however, that deleting a Web server does not delete the applications associated with that Web server, or the resources contained in those applications.

Preferably, a server tree can be created, which allows administrators to control which URIs are added to which applications. For example, the server tree restricts a marketing administrator from taking control of finance applications. The administrative role that creates a server tree seizes ownership of the applications in that tree. In order to place applications in a tree, the Create button in the Server Trees window of the Web Servers page shown in FIG. 20 is clicked. This brings up the Create Tree dialog window, as shown in FIG. 22.

Figure 22:
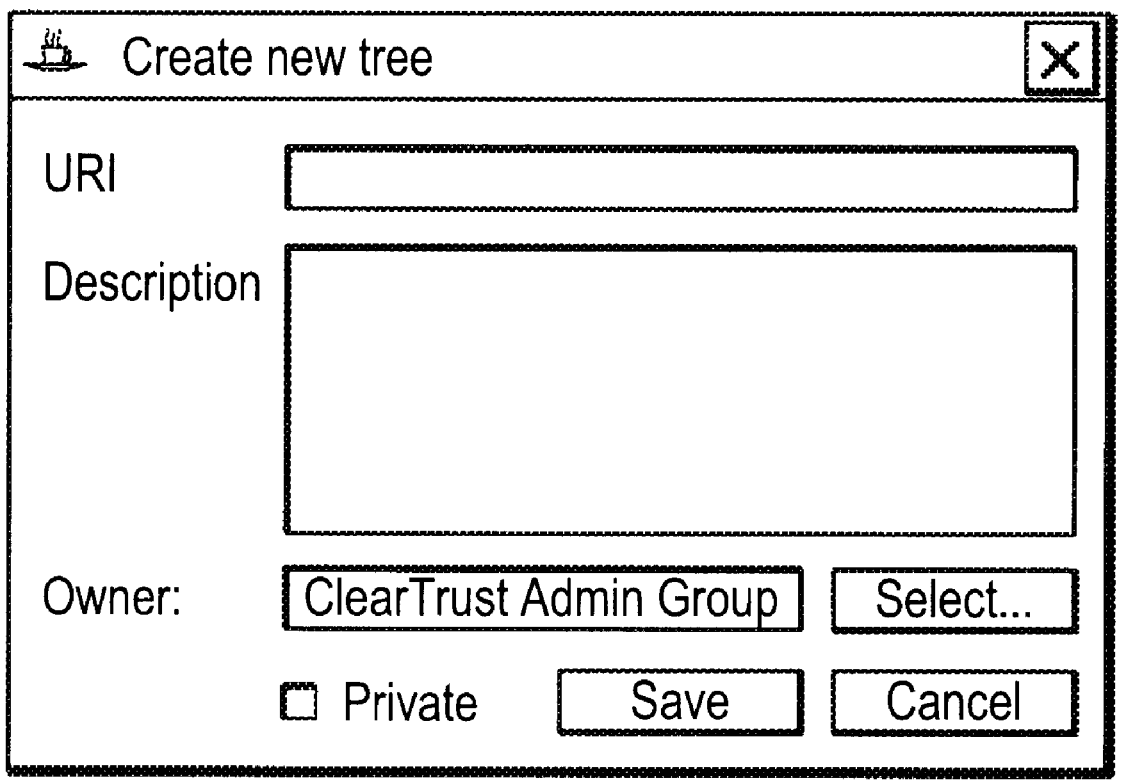

Referring to FIG. 22, a server tree requires only a URI and a description. Note that server tree URIs can be inclusive, for example, the URI "/Marketing/applications/" would contain everything in the /applications/directory.

The Private checkbox which appears in the Create Tree dialog window controls administrator access to applications. If a server tree is marked Private, only the administrator that created the tree can see that tree or administer the tree. On the other hand, public applications can be seen, although not necessarily administered, by any administrator. Clicking Save creates the server tree, and clicking Cancel aborts the creation of a tree. Once a server tree is created, only the super user or the administrative role that created the tree can add applications to that tree, or modify existing applications on that tree.

Figure 23:
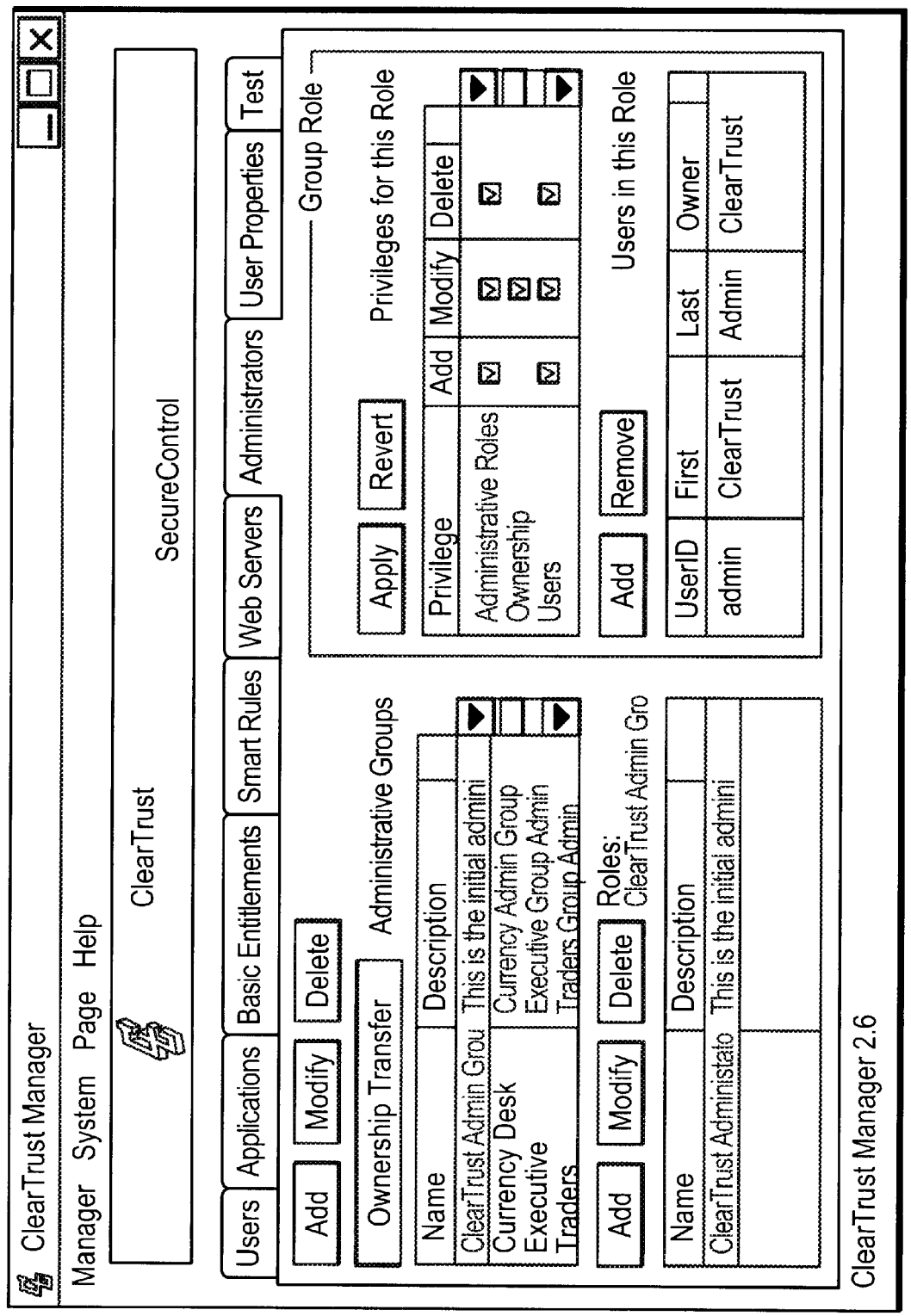

Referring to FIG. 23, the Administrators page is the tool for defining security administrators and administrative duties. An administrator can be given the power to control any selection of users, groups, or realms, any applications, and any privileges. The design of the administrative system will now be described in more detail.

The basic functions of the Administrators page are defining Administrative Groups and Administrative Roles. Administrative Groups can consist of any combination of ownable resources. Administrative Groups can be created to reflect organizational structure (such as creating a Marketing Department group), geography (such as the New York or Europe administrative group), or any other criteria. The defining factor of an administrative group is that all members of the group are controlled by the same administrative roles.

An administrative role is a collection of duties and responsibilities assigned to an administrator, much like a job description. After the "empty" administrative role has been created, privileges are assigned to that role. The privileges describe what functions the administrative role entails. Finally, users are added to the administrative role. Each user added to the administrative role automatically becomes an administrator, which empowers the user to administer the privileges assigned to that role to all of the users in the related administrative group.

Figure 24:
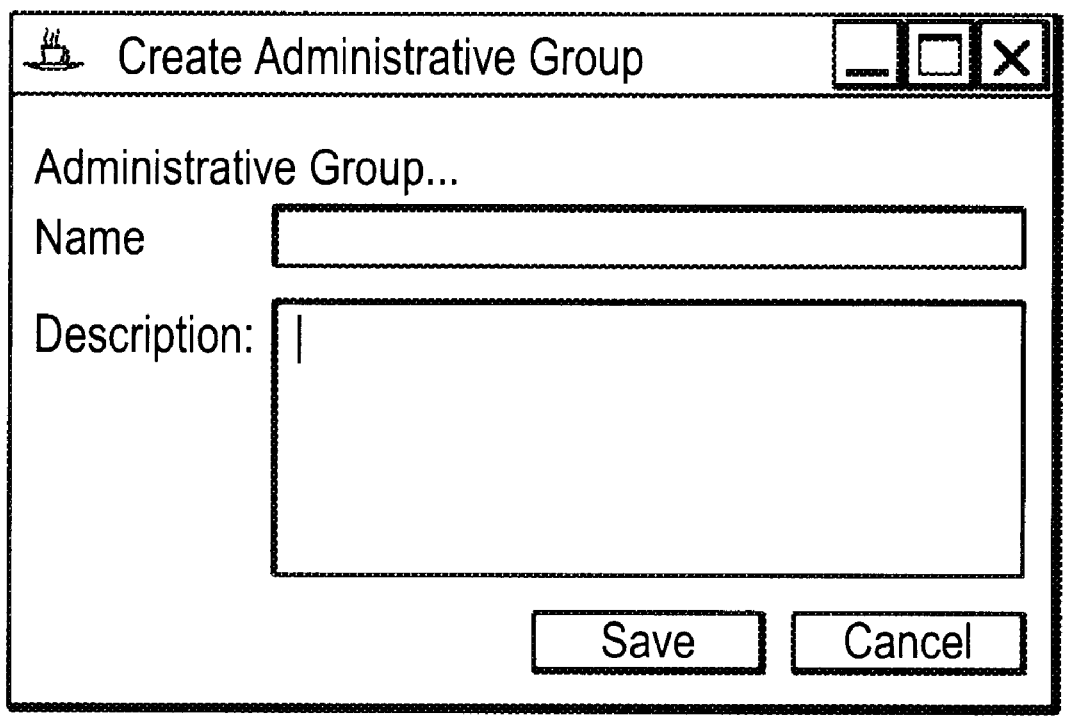

In order to create an administrative group, the Add button above the Administrative Groups window is clicked to bring up the Create Administrative Group dialog window, as shown in FIG. 24. Each new group requires a Name and a Description. Clicking the Save button saves that information to the entitlements database 32 and creates the group. Clicking the Cancel button cancels the creation of the group.

Additionally, an administrative group must be populated with users who serve as administrators. When an administrator logs in, he or she chooses an administrative role/ administrative group with which to work for that session. During that session, ownable resources created are by default owned by that administrative group. Users can be in multiple administrative groups.

Furthermore, administrative groups can be nested. For example, an enterprise can create a hierarchical administration structure which allows for a grandparent→parent→child→grandchild type structure. Additionally, the enterprise can avoid being in the business of administration and is able to push administration of additional groups down the administration chain.

Figure 25:
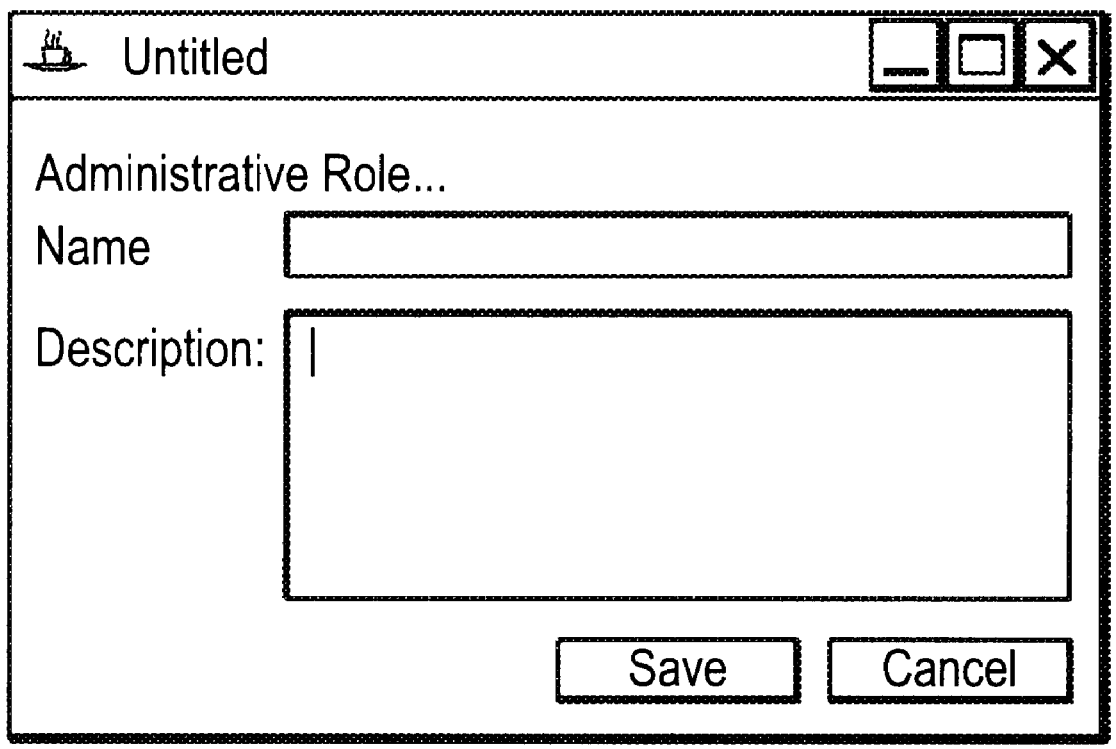

The appropriate administrative role must also be created. Clicking the Add button above the Administrative Role window on the Administrators page shown in FIG. 23 brings up the Administrative Role dialog window, as shown in FIG. 25. Each new role requires a Name and a Description. Clicking Save adds the role to the entitlements database 32, and clicking Cancel aborts the creation of the role.

Note that a new administrative role is "empty." That is, no user can act in that role, and the role itself is not associated with duties or privileges. Users must be added to the role, and privileges for the role must be defined, before the role can be used.

Users can be added or deleted in an administrative role. In order to add users, the Add button above the Users in this Role window on the Administrators page shown in FIG. 23 is clicked. This brings up the Add User dialog window. Once the user has been selected in the list, clicking Save will complete the addition, and clicking Cancel will abort. In order to delete a user from an administrative role, the User is highlighted in the Users in this Role window, and the Delete button is pressed.

In order to add activities to an administrative role, the appropriate checkboxes are checked in the Privileges for this Role window on the Administrators page shown in FIG. 23. In the Privileges window, all of the privileges that are available to that administrative role are checked. When the Privileges have been selected, the Add button is clicked to complete the change, or the Revert button is clicked to return to the last saved privileges. For a new role, clicking the Revert button removes all privileges.

Descriptions of the available privileges are as follows. Group privileges allow an administrator to create or delete groups, or modify the properties of a group. Similarly, realm privileges allow an administrator to create or delete realms, or modify the properties of a realm. The Applications privileges allow the administrator to create, modify, or delete Web applications, including application resources (or URIs). The Web servers privileges allow the administrator to create, modify, or delete Web servers 20A, 20B, 20C. As shown in FIG. 23, the Administrative Roles privilege allows the administrator to Add, Modify, or Delete administrative roles. Also, Users privileges allow an administrator to Add and Delete users, and Modify user properties (user ID, name, and description). The Passwords privilege allows an administrator to modify (but not create or delete) a password for a user. Finally, Property Definitions privileges allow an administrator to create, delete, or modify user properties aside from basic properties, such as user ID and name.

Referring to FIG. 26, a user can have an unlimited number of User Properties aside from the required information provided at the create date of the user (user ID, name, and password). These User Properties can be extremely valuable in creating and enforcing smart rules, as described earlier. On the User Properties page shown in FIG. 26, those properties can be created and deleted, and their characteristics can be modified. The User Properties page initially shows all of the available user properties. The user properties have the following characteristics.

The Name is the property name. The Name can be useful to make names an unending string of characters, breaking up words with capital letters (newPropertyName) or underscores (new_property_name). Type allows a choice from five different property types: BOOLEAN (a Boolean True or False); DATE (a date); FLOAT (a floating point number, for example, 3.142 or 1/3); INT (an integer); and STRING (a character string).

Owner identifies the administrator. The default property owner is the administrative group associated with the administrative role creating the property.

Not Null means that the property can be null or empty for a particular user. The setting is either true or false.

A public property can be seen or changed (depending on the setting of Read Only, as described in more detail below) by any administrator. A non-public property can only be seen or changed by the property owner (the administrative role that created the property).

A property that is designated Read Only cannot be set or changed by anyone but its owner (the administrative role that created the property). Because the owner must always be able to set or change a property, User Properties cannot be Read Only if they are not public.

A short description of the property can also be provided by the administrator. The description helps identify the property.

Figure 27:

An administrator with the proper permissions can create a new user property. Clicking the Create button on the User Properties page shown in FIG. 26 brings up the Create User Property dialog window, as shown in FIG. 27. Once the property characteristics have been set, the Save button can be clicked to add the property to the entitlements database 32, or the Cancel button can be clicked to abort.

A user property can be deleted. The user property to be deleted is highlighted to select the property to be deleted. Pressing the Delete button removes the property from the entitlements database 32.

A user property can also be modified. After selecting the property to be modified, clicking the Modify button on the User Properties page shown in FIG. 26 brings up a Modify User Property dialog window. This window is identical to the Create User Property dialog window shown in FIG. 27, but the details of the selected user property are included and can be edited. Once the user property has been changed as needed, clicking the Save button saves the changes, and clicking the Cancel button aborts. Some characteristics of the property, specifically Owner, can only be changed by administrators with special permissions (specifically, the ability to Modify Ownership, set on the Administrators page). User Properties can only be set for existing users, by modifying that user on the Users Page.

Operation of the security and access management system 10 will now be described. In one preferred embodiment, the security and access management system 10 comprises a UNIX embodiment. The UNIX embodiment comprises a Solaris v2.5 or higher operating system on a Sparc processor.

In order to start or stop the servers 12, 14, and 16, shell script commands in the form <SIRRUS_HOME>/cleartrust/scripts/ctrust and <SIRRUS_HOME>/cleartrust/scripts/ctserver can be used. On the one hand, the ctrust shell script can be used when the entire server suite needs to be started or stopped. On the other hand, the ctserver shell script can be used to start or stop individual servers.

Considered in more detail, the ctrust shell script starts an entire server suite. In the preferred embodiment shown in FIG. 1 in which the authorization component 12 comprises at least one authorization dispatcher 26 and at least one authorization server 24, a server suite comprises the following servers: the entitlements (database) server component 14; at least one authorization dispatcher 26, and one or more authorization servers 24A, 24B, 24C. The syntax of the ctrust script is: ctrust {start|stop }. In order to configure the number of authorization servers 24A, 24B, 24C started when ctrust is run, the file <SIRRUS_HOME>/scripts/startup is edited. This file simply calls ctserver repeatedly, starting one authorization server 24 after another. An exemplary startup is as follows:

ctserver dataserver
    sleep 10
    ctserver dispatcher
    sleep 2
    ctserver authorizer 5020
    ctserver authorizer 5021
    ctserver authorizer 5022

Alternatively, in order to start the database server process, three authorization server processes, and an authorization dispatcher process in one step, ctrust start can be entered at the shell prompt. In contrast, in order to stop all server processes running on a given machine, ctrust stop can be entered at the shell prompt.

Also, as described earlier, the ctserver shell script starts or stops individual servers. The syntax of the script is: ctserver {dataserver|dispatcher|authorizer<port>} [stdout redirect]. For example, in order to start the entitlements (database) server component 14, ctserver dataserver is entered. As another example, starting an authorization dispatcher 26 with stdout redirected to a file requires that ctserver dispatcher dispatcher-stdout.log be entered. Additionally, in order to start an authorization server 24 on a port 5050, ctserver authorizer 5050 is entered. The authorization dispatcher 26 is typically started prior to starting any authorization server 24.

Figure 28:
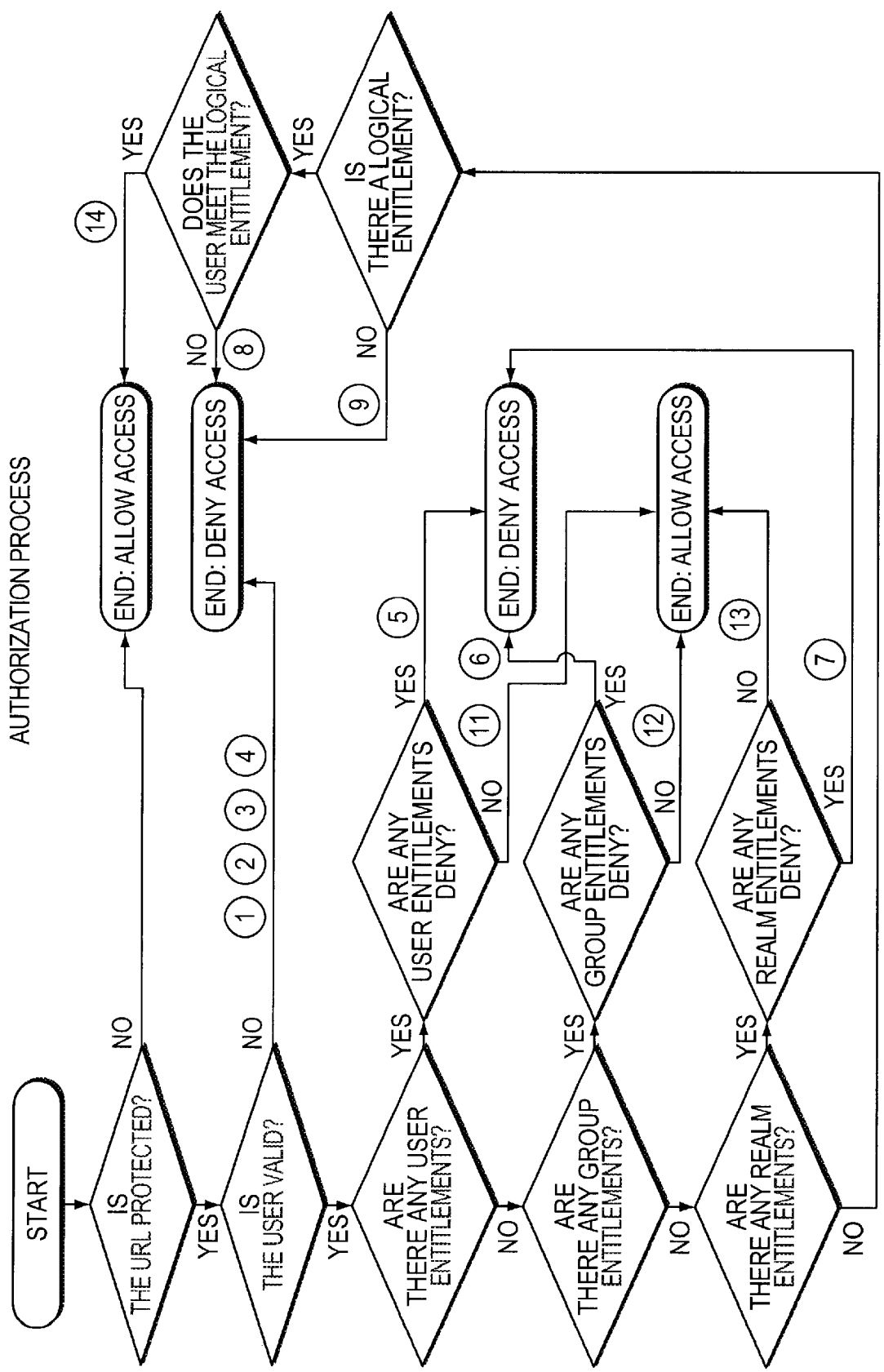
FIG. 28 is a flow chart of an authorization method in accordance with one embodiment of the present invention.
Figure 29:
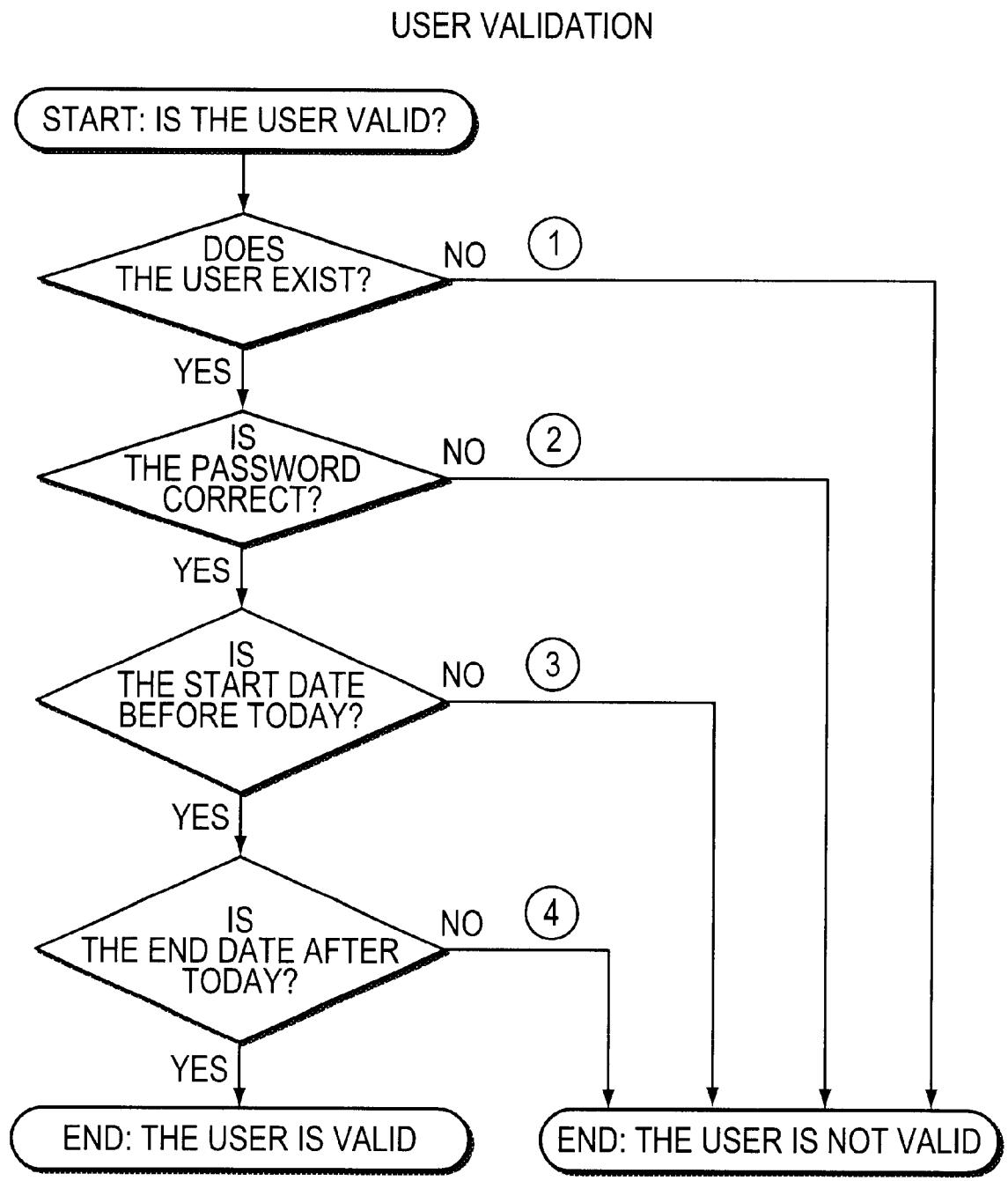
FIG. 29 is a flow chart of the user validation step shown in FIG. 28.

In operation, when an authorization server 24 receives an authorization request from either an enabled Web server 20 or from an API client 22, the authorization server performs various steps for authorization, as shown in FIG. 28. In order to determine whether or not the user is valid, when an authorization server 24 receives an authentication request from either an enabled Web server 20 or from an API client 22, the authorization server performs various steps for validation, as shown in FIG. 29.

The security and access management system 10 preferably supports single sign on (SSO) using an encrypted cookie. The cookie is created for each user after the first successful authentication of the user. Subsequently, the cookie passes a Web user's credentials to the Web server plug-in, eliminating the need for the user to submit his or her password again. This cookie enables all protected Web servers 20A, 20B, 20C to share authentication information. A user that authenticates with Web server 20A, protected by the security and access management system 10, will not have to re-enter a password when accessing Web server 20B or 20C protected by the security and access management system.

Referring to FIG. 30, the single sign on process is as follows.

1) The browser requests secured content from protected Web server 20A.
2) The plug-in for Web server 20A checks for a cookie.
3) Because this is the first authentication, the user provides his or her username and password.
4) User permissions are checked.
5) A cookie is built and set for the browser.
6) The Web user accesses protected Web server 20B.
7) The plug-in for Web server 20B uses the cookie for authentication.
8) Permissions are checked for the user based on the user's credentials contained in the cookie.

In order to prevent malicious users from stealing the password from the cookie, the security and access management system 10 encrypts the cookie with either 128-bit triple DES encryption or 128-bit Blowfish to provide server-side protection. The strength of this public key encryption is further enhanced by the crypto-server which rotates the public keys on a continuous and configurable basis and communicates only across SSL secured channels to trusted and authenticated plug-ins. The SSL encryption prevents a malicious user from obtaining the public key in the first instance, and the key rotation makes the public key only usable for a limited period of time. Also, Web user passwords are never passed in the clear, but rather are hashed using MD5, and only hashed passwords are stored in the entitlements database 32.

Additionally, the cookie is protected on the client in four ways. First, the cookie is stored in memory on the browser computer, preventing malicious users from reading the cookie from disk. Second, the cookie contains IP address-specific information that is checked to see whether the information is coming from the IP address for which it was created, preventing a malicious user from stealing the cookie and using it from another computer. Third, the cookie has time out settings for inactivity that renders it unusable after a determined period of inactivity. This prevents a malicious user from using a vacant computer to gain access to a trusted user's protected resources. Fourth, the cookie has a maximum lifetime setting that forces a re-authentication if the time threshold is exceeded. The time out settings, both for inactivity and maximum lifetime, are set on a per Web server basis. Different Web servers can have different time outs, and time out settings apply globally to a particular Web server.

For added protection, the Web server preferably runs with SSL encryption turned on. This further protects the passwords by encrypting communication, including cookie transmission, between the Web browser and the Web server.

Considered in more detail, the cookie contains user ID, password, Client IP address, issue time, and last hit time. Nonce information is also included to further obfuscate the cookie data. All of this information is encrypted. External applications that need this information can access it via the secure API using either Java or C language, but are not able to decrypt the cookie itself.

Web applications secured by the security and access management system 10 may require user information to be transferred back to them to enable seamless sign-on. This eliminates a second sign-on at the Web application level after the user has been authenticated by the security and access management system 10. For example, if Web user Steve accesses a Web application protected by the security and access management system 10, Steve's identity can be passed to the API and also on to other Web applications. This is done by:

1. Once a user is authenticated, the user's username is presented as an environmental variable in the HTTPD header presented by the browser to the Web server for each request.
2. This username is the one used to authenticate against the security and access management system 10. When making an API call, an application can incorporate that environmental variable as part of the API call, for example, "get all the user properties for username=steve." The username presented to the API application has already been authenticated by the security and access management system 10 (e.g., Steve was challenged for his username and password in his attempt to access the application), making this secure. Retrieving environmental variables from the browser is a trivial programming task, clearly documented in many Web programming guides. Therefore, the cost to modify applications to support seamless logons is minimal. This modification is only needed if the back-end application requires a logon sequence.

The security and access management system 10 is also able to deal with multiple usernames using single sign on. When using the Web to access legacy applications, it is often convenient to centralize sign-on information so that end users do not need to remember multiple usernames and passwords. The security and access management system 10 can be used to centrally store usernames for legacy applications.

For example, consider that user Steve may have one username/password for Web applications and a different username and password for a legacy application. Single sign on from the Web to the legacy application can be accommodated by storing the user's legacy credentials as user properties for Steve such as legacy_username and legacy_password in the entitlements database 32. The legacy Web application would then query the API and request the legacy_username and legacy_password for ct_username=steve. The results can then be transferred to the legacy application to be used in the logon procedure. Since this is performed programmatically, the user is not aware of the second logon process. To the user, it seems as if he or she only logged onto the Web site once.

The security and access management system 10 can preferably be configured to perform various types of logging. Logging capabilities include user activity logs and system logs.

The security and access management system 10 is capable of several levels of logging of user activities. The level is selected by setting a parameter value in a Default.conf configuration file.

In one preferred embodiment, there are thirteen types of events that can occur during the authentication/authorization process, and each one represents a user request and the resulting action taken by the security and access management system 10. These events are represented by the circled numerals which appear at the end points of the authorization and authentication flow diagrams in FIGS. 28 and 29, respectively. The security and access management system 10 can be set to record the following user events.

1. Invalid user
2. Invalid password
3. Inactive account
4. Expired account
5. User denied based on user level explicit entitlement
6. User denied based on group level explicit entitlement
7. User denied based on realm level explicit entitlement
8. User denied based on smart rule
9. User denied because no entitlement existed
10. User allowed based on user level explicit entitlement
11. User allowed based on group level explicit entitlement
12. User allowed based on realm level explicit entitlement
13. User allowed based on smart rule Preferably, the security and access management system 10 can be configured at four different logging levels. The logging levels, and the actions that are written to the log file at that level (by number on the list above), are listed below. Note that each level is a superset of the previous level.

0—None
10—User Validation (1–4)
20—All Denies (1–9)
30—All (1–13) Also, there are preferably several items of information logged to the file for each activity. The items are (in the preferred order):
Date and time the activity was logged
Username
address of the user
Activity (from the list above)
Date and time that the activity occurred
URI requested
Web server
Application requested (for actions 5–12 from the above list only).

In a preferred embodiment, the log file rotates itself automatically. In other words, when the log file reaches a pre-defined size, which is preferably configurable, the log file is time stamped, and a new log file is created. The administrator can elect to implement a process for archiving these log files, as they typically grow relatively fast because they represent all protected intranet/extranet usage. If a logging level of thirty is selected, these log files will grow about as fast as all of the protected web server log files combined. The delimiter separating the columns of information in the log file is preferably configurable as well.

The security and access management system 10 preferably monitors for and detects attempts for unauthorized access. Servers should have intrusion detection policies assigned, not at the application level. Also, intrusion detection can be performed at the application level. Intrusion detection is preferably based on event/defined frequency=action.

Considered in more detail, pre-defined events that can trigger an action are one factor and are, in order of severity: bad password; access function denied; other function denied (unauthorized); and bad account. Keeping events limited to the four types of most critical events reduces complexity.

Frequency is another factor. Preferably, users are able to select the frequency based on a drop down box or other time-based system. Pre-defined frequency settings are preferable.

The third factor is responsive action. Pre-defined actions which the event and frequency combination can trigger are preferably selectable by the user. The user is preferably able to select one or more of the following actions. One action is an e-mail sent to an administrator, and the user can preferably define more than one recipient. Another action is to disable an account, which produces an API call that sets the user's account validity to not work. Preferably, this should be configurable to set "disable for 24 hours" or "disable for 1 hour" or "disable indefinitely." A third action is to log the event in an event log file, which is preferably a log area in which the above events are recorded that is distinct from other logs. Also, a contemplated action is to set a simple network management protocol (SNMP) trap, which results in an SNMP notification being sent to a predefined IP address. Finally, another contemplated action is to reconfigure the firewall.

Reports of events are preferably available and are viewed through the graphical user interface using pre-defined basic lists. The lists preferably include: Event view, which lists all of the detected events by time and ranked by severity; Source IP report, which lists all the violating IP addresses; Server and/or Application report, which lists the most attacked resources; Attack times list, which lists the busiest times attacks occurred; and Top Twenty attack targets list, which lists just the twenty most attacked resources.

The intrusion detector consists of two components, namely, a graphical user interface and a daemon. These components will now be described in more detail.

The graphical user interface is structured in such a way as to easily fit into the overall management console graphical user interface. The graphical user interface for the intrusion detector is a tab-based paradigm. The graphical user interface preferably comprises panels for: policies; reports; configuration; and action definitions.

Figure 32:
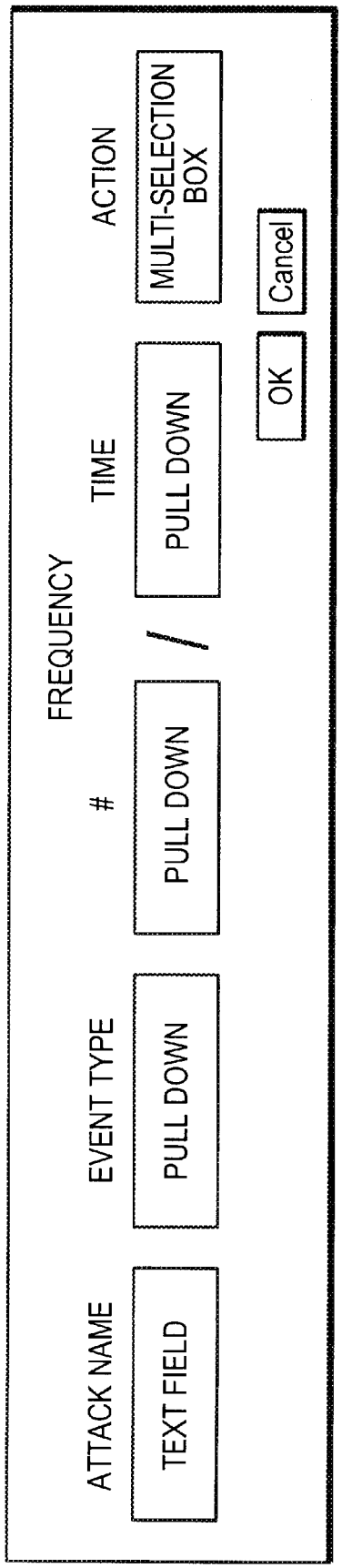

Referring to FIG. 31, the panel for setting policies will now be described. The policies panel is for maintaining the list of attacks to scan for. This list is preferably table-based, displaying all the attack types. Each attack type preferably includes: Attack name, Event type, Frequency, and Action(s) to be taken. When double clicking on one of these actions, the Edit Attack dialog window (FIG. 32) will appear with the information about the attack loaded in. At the bottom of the policies panel are buttons for: Add, Modify, Delete.

Figure 33:
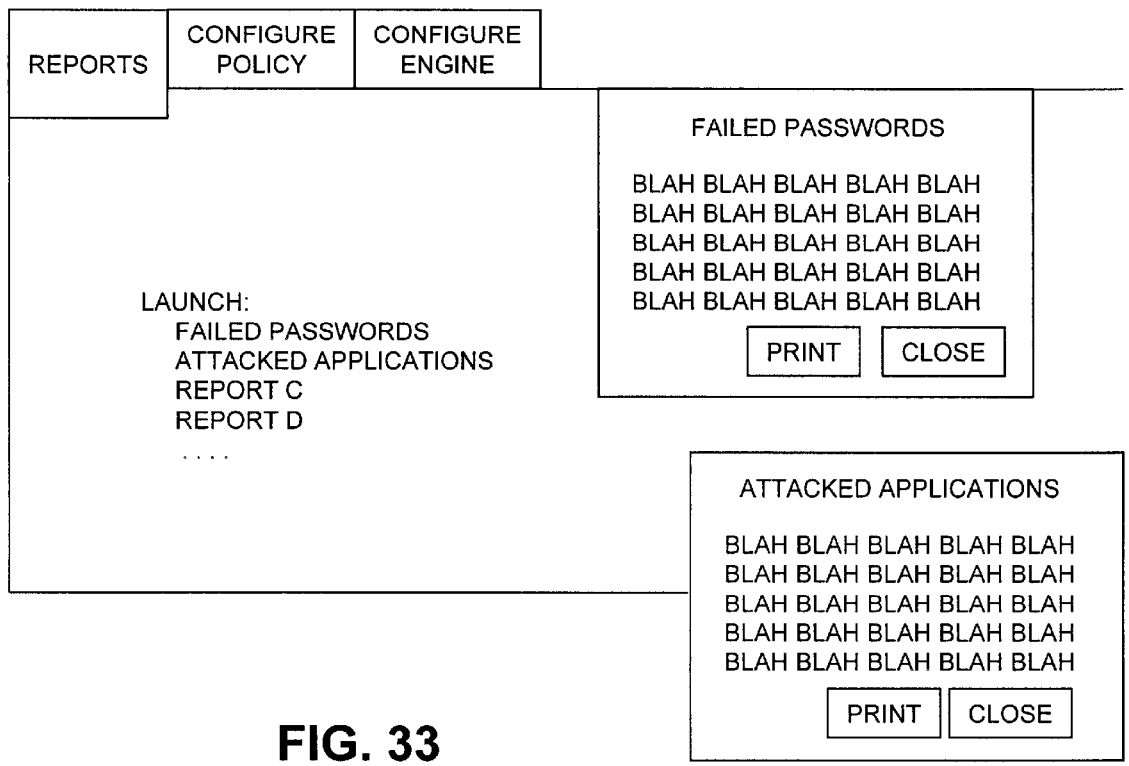

Referring to FIG. 33, the reports panel is shown. The following reports are preferably available, selectable from a list box: List all of the events of a certain type; List the IP addresses which are violating (events sorted by IPs); Events sorted by application; Attacks sorted by time; and top twenty attacks on a particular application/resource. These reports are preferably printable. The reports are also preferably in their own windows so that several can be run and compared with each other.

Additionally, a configuration panel allows the user to set up the connection to the API server 16. There is a test button there as well (like in LDAP). The password should not be shown. The configuration panel is employed to configure the database connection as well. All configuration is performed through the graphical user interface.

Finally, an action definitions panel is provided. The user is able to define new actions here which allow the user to define action names and associate them with Java classes which will be placed in a designated directory on the machine on which the daemon runs. A javadoc is provided for the interface to which these actions are written.

The second component of the intrusion detector is the daemon which runs and scans the database for the different attack types. When attacks are found, the appropriate actions are taken. Preferably, the attack is also recorded in the entitlements database 32, along with the rule information so that there is a record in case the attack rules change. Additionally, the actions taken are recorded.

The daemon runs as both a process and an NT service on Windows NT, and a process on Sun Solaris. The daemon is responsible for assuring that the entitlements database 32 is managed so as not to grow too big. The daemon runs on a dedicated Java runtime environment (jre) which will install along with the daemon. Both the daemon and client preferably install through an installshield package. The daemon polls the entitlements database 32 for the "dirty" flag to determine if it needs to reload tasks. This dirty flag is set by the graphical user interface when the attacks have been changed.

The security and access management system 10 preferably includes a Suspicious Activity Monitoring Protocol (SAMP). The API defines an interface through which a SAMP client can communicate with a FireWall-1 management server. The management server in turn directs FireWall-1 modules to terminate sessions or deny access to specific hosts which have been identified by SAMP clients as generating suspicious activity on the network or server system. The specific actions taken by the firewall might include terminating a current session in progress or blocking new session attempts that match the criteria over a specified time period in the future.

The SAMP client application is capable of identifying suspicious activity on the network or a specific host. Examples of such activity include: a specific client making repeated connection attempts to privileged services on a specific host (e.g., scanning); a client attempting to issue illegal commands or repeatedly failing to complete a login to a server system for which access by the client would generally be considered permissible (e.g., a user accessing an Internet-accessible Web server, but attempting to send illegal CGI commands through a form); or any other criteria set which if met, qualifies the activity as an inferred security threat. SAMP applications generate action rules that are dynamic and time-dependent, unlike rules defined in the context of the Security Management Server, which are permanent. Additionally, SAMP does not allow connections to pass through the firewall unless they are already allowed by the explicitly defined management policies. Only additional blocking of specific connections for a limited time period is possible via SAMP.

In order to take action, the firewall must be able to track and act on sessions, rather than just individual packets. FireWall-1's Stateful Inspection technology, using multi-layer logic and state information, is capable of identifying packet streams as part of a session, even though the session may be through a connections protocol such as UDP. A session may even comprise more than one TCP/IP connection.

Through the APIs, FireWall-1 will report blocked sessions back to the SAMP client application, which helps trace the path of an attack. In addition, SAMP applications can use other OPSEC interfaces and APIs to send logs, alerts, and status messages to the other FireWall-1 management server for centralized security monitoring.

The security and access management system 10 also preferably creates several system log files. Some of these system log files are generated during installation and change infrequently, while others are generated by the servers 12, 14, 16 during runtime and need to be managed by a system administrator. All log files reside in a single directory, for example, <SIRRUS_HOME>/cleartrust/<ORACLE_SID>/logs/. The following system log files are preferably created by the security and access management system 10.

If an error occurs while processing an API request, the API server 16 preferably writes a detailed account of the error to a CT_API_Errors.log log file. The information from the API errors log file can be used to help diagnose problems with an API client 22.

The API server 16 preferably records all connections and disconnections of API clients 22 in a CT_API_Logon.log log file. The API logon log file can be used for auditing API usage.

The API server 16 preferably records a summary of all transactions in a CT_API_Transactions.log log file. The API transactions log file can also be used for auditing API usage.

A configuration log file, CT_Configuration.log, is preferably created during the installation process. The configuration log file simply records any errors that occur during installation.

A database installer log file, CT_DatabaseInstaller.log, is preferably created or appended to when the schema of the entitlements database 32 is built. Any errors that occur during a schema build appear in the database installer log file.

A data server log file, CT_Dataserver.log, preferably records all errors that occur during runtime operation of the entitlements server 14, including all SQL-related errors. Automatic rotation of the data server log file preferably occurs when the log file reaches a predetermined size, for example, five megabytes. The data server log file will typically grow over time, because some SQL errors are a result of normal operation.

A dispatcher event log file, CT Dispatcher_Events.log, preferably records events that result from normal operation of the dispatcher 26. When a plug-in requests the list of available authorization servers 24A, 24B, 24C, when an authorization server registers with the dispatcher 26, or when readiness of an authorization server to handle requests is assessed, an event is entered in the dispatcher event log file. The dispatcher event log file grows over time and needs to be managed by a system administrator.

A dispatcher errors log file, CT Dispatcher_Errors.log, preferably records all errors that occur within the dispatcher 26. The size of the dispatcher errors log file typically remains at zero bytes, and any size above that indicates improper operation of the authorization servers 24A, 24B, 24C.

An authorization server log file is named using the port supplied during startup, that is, CT_Authorizer_<port>.log. The authorization server log file preferably records all errors that occur during runtime operation of the authorization server 24A, 24B, 24C connected to the port. The size of the authorization server log file typically remains at zero bytes, and any size above that indicates improper operation of the connected authorization server.

Finally, the user activity log file described earlier, CT_UserActivity_<port>.log, preferably records information about the actions taken by the authorization servers 24A, 24B, 24C in response to user requests. Each authorization server 24A, 24B, 24C has a corresponding user activity log file, and the port to which the authorization server is connected is used in the name of the log file. For detailed information about what the user activity log file contains, refer to the earlier description of user activity logging.

An administrator can create scripts that monitor these log files and initiate automated response actions. For example, a script can monitor the CT_Dispatcher Events.log and notify a systems management console in the event that an authorization server 24A, 24B, 24C becomes unavailable.

Finally, an LDAP directory is an effective way to store commonly shared organization information that can be accessed using standard Internet protocols. Because of its centralized, platform and vendor independent design, it is ideal to leverage LDAP into the Web security infrastructure. However, while LDAP directories provide excellent centralized data repository and access functionality, they do not provide tools for defining, managing, and deploying Web security policy.

The security and access management system 10 provides software tools to define and manage security policy. The security and access management system 10 also provides functionality needed to deliver security policy in order to secure Web servers, data, applications, CORBA applications, and other Web technology.

The security and access management system 10 can leverage data that resides in an LDAP directory like other LDAP-enabled applications. By leveraging the LDAP directory data, organizations can centrally manage user information in the directory and use the security and access management system 10 to define security policy and to secure Web resources.

In a preferred embodiment, the security and access management system 10 provides a Web security system that combines native LDAP support with powerful Oracle database scalability. This combination of the security and access management system 10 and LDAP provides many benefits and enables:

1) companies to use an LDAP directory server to centrally store and manage user information, such as passwords, e-mail addresses, contract numbers, and other common user attributes;
2) companies to use multiple LDAP directory servers, including those from Netscape or Novell;
3) Web applications to incorporate users' LDAP attributes to dynamically generate personalized Web pages; and
4) Business to business application and data integration across firewalls via LDAP.

In summary, the security and access management system 10 provides:

Distributed Architecture
  Distributed component architecture based on the CORBA standard
  Event system on the graphical user interface so that events are propagated across all dependencies
  Session based events are cached
  Can communicate across platforms and servers because of Java and CORBA combined implementation
  System can be monitored and logs are kept of system activity and errors
  Multiple system components can be run simultaneously
Business Rules—Secure Rules—Smart Rules
  Data driven meanings are driven from data about a user, both individually and at group level.
  Rules are executed against data about a user that is dynamic, therefore access control decisions can be automated. For example, a rule can be defined that states "a user may only access the resource if the user's credit rating is good and if they have done at least $5000 of business with the Firm." In this example, the credit rating and dollar amounts are subject to change. Because the rule system can access up-to-date information without administration intervention, the changes that affect the user (credit or sales volume) automatically affect the user's access privileges.
  Rules can be grouped together using "and" and "or" operators
  Rules can be ordered in terms of Allow before Deny
  Rule operators reflect data type of the user property—date data type has date operators "before" and "after"
  Rules can be driven off of LDAP attributes
  Rules can be applied to both the ACCESS control function, as well as f(n) not access
  Rules are driven at runtime and are dynamic Data that is evaluated can be driven off of internal data, as well as external data Supports various data types: integer, Boolean, date, string, float Rules can be applied to grouping of roles—must be "Role A and Role B but not Role C"

Rules can be driven externally and included in decisions

Virtual Business Units

Selective administration authority per administration role—"functions"

Selective administration authority per administration group—"resources"

Selective sharing of resources between virtual business units—"groups" and "realms"

Administrator selects appropriate administrative role when accessing system

Confidentiality ensured between administrative groups

Configurable ACLs through graphical user interface determine administrative roles' abilities Unlimited number of roles and users in each administrative group Can define a resource only in a single application to ensure integrity Administration groups can be nested Can be accessed across the network by trading partners or entities not within the company—supply chain partner or distributor Can define a super user with a single click System can be programmatically administered through the API Unified Access Management Management framework for both security policy design and technical implementation Multi-tier conceptual model that abstracts technology from policy Unified security services delivery tier—brings policy out to point of deployment Unified security policy management tier—allows common security policy to be defined and managed across an enterprise Common infrastructure integration tier—allows components of existing infrastructure to be integrated into overall security management Addresses externalized access control and authorization rules Defines the technical requirements for developing a unified access management system Defines scalability along key aspects: distributed architecture, CORBA design, reliability, manageability, performance, and capacity Fail-over Shadow—Configurable Load Balancing Round robin and primary/secondary Server dispatcher Notification of downed events/pinging/email to administrator Can occur across platforms and distinct servers Error logs are written to allow tracking of problems Functions other Than Access Graphical user interface administration and definition of functions Administration down to the function level Secure rules apply to functions other than access ACLs can be applied to functions API in Java, C, and CORBA IDL to integrate functions other than into applications Auditing logs can identify whether a user was allowed or denied at the function level Secure Detector Detect suspicious activity as users attempt to access Web resources Can identify preset attacks, as well as user defined Can perform a number of actions such as email administration, disable account, and reconfigure firewall Can record a list of suspicious activity for reporting and review SSO without Back-end Allow for distribution of single sign on component without back-end access control management system The single sign on can have an alternative back-end access control management component easily integrated The single sign on component will operate seamlessly with the back-end access control management system Resource Based Authentication Security services through GSSAPI and CDSA Encrypted SSO Java graphical user interface for Web security system LDAP integration Multiple forms of authentication APIs Audit logging Password management It will be understood and appreciated that the embodiments of the present invention described above are susceptible to various modifications, changes, and adaptations. All is intended to be comprehended within the meaning and range of equivalents of the appended claims.

What is claimed is:

1. A security and access management system for at least one application on a computer network, comprising:

at least one computer operated by a user;

at least one application server for executing the application in response to access granted to a request generated by the user;

a communication link for interconnecting the computer operated by the user to the application server;

at least one authorization server connected to the application server for performing authorization processing; and an entitlements database interfaced to the authorization server, the entitlements database for storing data utilized by the authorization server for responding to the request generated by the user to one of grant or deny the request for execution of the application by the user.

2. The system of claim 1 wherein there is a plurality of authorization servers, the system further comprising an authorization dispatcher for routing a request for access to the application to one of the authorization servers.

3. The system of claim 1, further comprising an API client connected to an API server for entry of data on which the response to the request is based, the system further comprising an entitlements server connected to the API server for entering the data needed for responding to requests into the entitlements database.

* * * * *